United States Patent

Hahn

(10) Patent No.: US 12,005,994 B2
(45) Date of Patent: Jun. 11, 2024

(54) BICYCLE CONTROL SYSTEM

(71) Applicant: SRAM, LLC, Chicago, IL (US)

(72) Inventor: Sage Hahn, Chicago, IL (US)

(73) Assignee: SRAM, LLC, Chicago, IL (US)

(*) Notice: Subject to any disclaimer, the term of this patent is extended or adjusted under 35 U.S.C. 154(b) by 568 days.

(21) Appl. No.: 17/338,113

(22) Filed: Jun. 3, 2021

(65) Prior Publication Data

US 2022/0388603 A1    Dec. 8, 2022

(51) Int. Cl.
*B62M 9/122* (2010.01)
*B62J 45/41* (2020.01)
*B62M 9/123* (2010.01)
*B62M 9/132* (2010.01)
*B62M 9/133* (2010.01)
*B62M 25/00* (2006.01)

(52) U.S. Cl.
CPC .............. *B62M 9/122* (2013.01); *B62J 45/41* (2020.02); *B62M 9/123* (2013.01); *B62M 9/132* (2013.01); *B62M 9/133* (2013.01); *B62M 2025/006* (2013.01)

(58) Field of Classification Search
CPC ...... B62M 9/122; B62M 9/123; B62M 9/132; B62M 9/133; B62M 2025/006; B62J 45/41
See application file for complete search history.

(56) References Cited

U.S. PATENT DOCUMENTS

| | | | |
|---|---|---|---|
| 3,929,025 A * | 12/1975 | Perry | B62M 9/123 474/81 |
| 5,254,044 A | 10/1993 | Anderson | |
| 5,261,858 A | 11/1993 | Browning | |
| 5,356,348 A | 10/1994 | Bellio | |
| 10,507,885 B2 * | 12/2019 | Chen | B62M 9/133 |
| 10,988,208 B2 | 4/2021 | Shahana | |
| 2009/0204299 A1 | 8/2009 | Miglioranza | |
| 2016/0067547 A1 * | 3/2016 | Anthony | G01P 15/0891 702/141 |
| 2018/0111661 A1 * | 4/2018 | Wesling | B62M 9/122 |
| 2020/0283096 A1 * | 9/2020 | Fujimoto | B62M 9/124 |
| 2021/0171156 A1 * | 6/2021 | Kitano | B62J 6/24 |

FOREIGN PATENT DOCUMENTS

| | | |
|---|---|---|
| CN | 101041371 | 9/2007 |
| CN | 103057654 | 4/2013 |
| CN | 106184602 | 12/2016 |
| CN | 106314673 | 2/2019 |
| JP | 2019-177844 | 10/2019 |

* cited by examiner

*Primary Examiner* — Edwin A Young

(57) ABSTRACT

A method for controlling electronic shifting of a bicycle includes identifying, by a processor, a gear shift command. The processor adjusts a cadence band based on the identified gear shift command. The cadence band includes an upper cadence limit and a lower cadence limit. Adjusting the cadence band includes increasing the upper cadence limit, decreasing the lower cadence limit, or increasing the upper cadence limit and decreasing the lower cadence limit. The electronic shifting of the bicycle is controlled based on the adjusted cadence band.

20 Claims, 10 Drawing Sheets

BICYCLE CONTROL SYSTEM

BACKGROUND

1. Field of the Disclosure

The present disclosure is generally directed to bicycle shifting control, and more particularly, to bicycle shifting control after a shift is executed.

2. Description of Related Art

A bicycle with electronic shifting may include crank speed sensors that generate data, from which cadence may be determined. The generated data and/or the determined cadence may be used as an input to automatic shifting algorithms for a transmission of the bicycle. An automatic shifting algorithm compares the determined cadence to a cadence band and may initiate a shift based on the comparison.

A transmission of a bicycle that includes a low number of gears (e.g., three gears) may have a wide and stable hysteresis between shift points. Gears of a transmission that includes a high number of gears (e.g., twelve gears), however, are closer together, and a cadence band for the automatic shifting is smaller compared to the transmission that includes the low number of gears.

SUMMARY

In one example, a method for controlling electronic shifting of a bicycle includes identifying, by a processor, a gear shift command. The processor adjusts a cadence band based on the identified gear shift command. The cadence band includes an upper cadence limit and a lower cadence limit. Adjusting the cadence band includes increasing the upper cadence limit, decreasing the lower cadence limit, or increasing the upper cadence limit and decreasing the lower cadence limit. The electronic shifting of the bicycle is controlled based on the adjusted cadence band.

In one example, adjusting the cadence band includes increasing the upper cadence limit from a first upper cadence limit to a second upper cadence limit, and after increasing the upper cadence limit, decreasing the upper cadence limit from the second upper cadence limit to the first upper cadence limit over a first time period, decreasing the lower cadence limit from a first lower cadence limit to a second lower cadence limit, and after decreasing the lower cadence limit, increasing the lower cadence limit from the second lower cadence limit to the first lower cadence limit over a second time period, or a combination thereof.

In one example, adjusting the cadence band includes the combination thereof. Decreasing the upper cadence limit from the second upper cadence limit to the first upper cadence limit over the first time period includes decreasing the upper cadence limit from the second upper cadence limit to a third upper cadence limit over a third time period. The third time period is less than the first time period. The third upper cadence limit is intermediate relative to the second upper cadence limit and the first upper cadence limit. Increasing the lower cadence limit from the second lower cadence limit to the first lower cadence limit over the second time period includes increasing the lower cadence limit from the second lower cadence limit to a third lower cadence limit over the third time period. The third lower cadence limit is intermediate relative to the second lower cadence limit and the first lower cadence limit.

In one example, the method further includes identifying, by the processor, an upper cadence limit modifier, a lower cadence limit modifier, a first decay factor, a second decay factor, or any combination thereof. The first decay factor is for the decreasing of the upper cadence limit from the second upper cadence limit to the first upper cadence limit over the first time period. The second decay factor is for the increasing of the lower cadence limit from the second lower cadence limit to the first lower cadence limit over the second time period. The increasing of the upper cadence limit includes increasing the upper cadence limit from the first upper cadence limit to the second upper cadence limit based on the upper cadence limit modifier, and the decreasing of the upper cadence limit includes decreasing the upper cadence limit from the second upper cadence limit to the first upper cadence limit over the first time period based on the first decay factor. The decreasing of the lower cadence limit includes decreasing the lower cadence limit from the first lower cadence limit to the second lower cadence limit based on the lower cadence limit modifier, and the increasing of the lower cadence limit includes increasing the lower cadence limit from the second lower cadence limit to the first lower cadence limit over the second time period based on the second decay factor.

In one example, the method further includes storing, by a memory, historical data related to cadence changes after gear shifts. Identifying the upper cadence limit modifier, the lower cadence modifier, the first decay factor, the second decay factor, or the respective combination thereof includes determining the upper cadence limit modifier, the lower cadence modifier, the first decay factor, the second decay factor, or the respective combination thereof based on the historical data.

In one example, adjusting the cadence band includes the combination thereof. Decreasing the upper cadence limit from the second upper cadence limit to the first upper cadence limit over the first time period includes decreasing the upper cadence limit exponentially or linearly from the second upper cadence limit to the first upper cadence limit over the first time period. Increasing the lower cadence limit from the second lower cadence limit to the first lower cadence limit over the second time period includes increasing the lower cadence limit exponentially or linearly from the second lower cadence limit to the first lower cadence limit.

In one example, the method further includes determining a type of the gear shift command, and setting the second upper cadence limit, the first time period, the second lower cadence limit, the second time period, or any combination thereof based on the determined type of the gear shift command.

In one example, determining the type of the gear shift command includes determining a shift direction based on the gear shift command, determining a number of shifts based on the gear shift command, and determining a source of the gear shift command. The source of the gear shift command is a shifting device of the bicycle or the processor.

In one example, when the determined shift direction is outboard, a difference between the first lower cadence limit and the second lower cadence limit is greater than a difference between the second upper cadence limit and the first upper cadence limit, and the second time period is greater than the first time period.

In one example, when the determined shift direction is outboard, the second time period and the difference between the first lower cadence limit and the second lower cadence limit when the determined number of shifts is two or more are greater than the second time period and the difference between the first lower cadence limit and the second lower cadence limit when the determined number of shifts is one, respectively.

In one example, when the determined shift direction is outboard, the second time period and the difference between the first lower cadence limit and the second lower cadence limit when the determined source of the gear shift command is the shifting device are greater than the second time period and the difference between the first lower cadence limit and the second lower cadence limit when the determined source of the gear shift command is the processor, respectively.

In one example, the method further includes identifying, by the processor, a cadence of a crank arm of the bicycle. Controlling the electronic shifting of the bicycle based on the adjusted cadence band includes actuating a motor of a rear derailleur of the bicycle for the electronic shifting of the bicycle when the identified cadence is outside of the adjusted cadence band.

In one example, the method includes determining, by a sensor, a cadence of the bicycle, and comparing, by the processor, the determined cadence of the bicycle to the cadence band. Identifying the gear shift command includes generating, by the processor, based on the comparison, the gear shift command when the determined cadence of the bicycle is outside the cadence band.

In one example, adjusting the cadence band based on the identified gear shift command includes determining a gear number from which the bicycle is being shifted for the gear shift command, and adjusting the cadence band a predetermined amount corresponding to the determined gear number.

In one example, a controller for a bicycle includes a memory configured to store one or more parameters for a predetermined cadence band. The predetermined cadence range corresponds to a gear shift from a first gear to a second gear. The controller also includes a processor in communication with the memory. The processor is configured to identify a gear shift command for the gear shift from the first gear to the second gear. The processor is further configured to adjust, based on the identified gear shift command, a cadence band for control of electronic shifting of the bicycle based on the one or more parameters. The cadence range includes an upper cadence limit and a lower cadence limit. The processor is configured to control the electronic shifting of the bicycle based on the adjusted cadence band. The adjustment of the cadence range includes an increase of the upper cadence limit from a first upper cadence limit to a second upper cadence limit, and after the increase of the upper cadence limit, a decrease of the upper cadence limit from the second upper cadence limit to the first upper cadence limit over a first time period. The adjustment of the cadence range also includes a decrease of the lower cadence limit from a first lower cadence limit to a second lower cadence limit, and after the decrease of the lower cadence limit, an increase of the lower cadence limit from the second lower cadence limit to the first lower cadence limit over a second time period.

In one example, the decrease of the upper cadence limit from the second upper cadence limit to the first upper cadence limit over the first time period includes a decrease of the upper cadence limit exponentially or linearly from the second upper cadence limit to the first upper cadence limit over the first time period. The increase of the lower cadence limit from the second lower cadence limit to the first lower cadence limit over the second time period includes an increase of the lower cadence limit exponentially or linearly from the second lower cadence limit to the first lower cadence limit.

In one example, the one or more parameters include a first modifier value for the increase of the upper cadence limit, a second modifier value for the decrease of the lower cadence limit, a first decay rate for the decrease of the upper cadence limit, a second decay rate for the increase of the lower cadence limit, or any combination thereof.

In one example, the processor is further configured to determine a type of the gear shift command. The determination of the type of the gear shift command includes a determination of a shift direction based on the gear shift command. The processor is further configured to set the second upper cadence limit, the first time period, the second lower cadence limit, the second time period, or any combination thereof based on the determined type of the gear shift command.

In one example, when the determined shift direction is inboard, a difference between the second upper cadence limit and the first upper cadence limit is greater than a difference between the first lower cadence limit and the second lower cadence limit, and the first time period is greater than the second time period.

In one example, in a non-transitory computer-readable storage medium that stores instructions executable by one or more processors to control electronic shifting of a bicycle, the instructions include identifying a gear shift command. The instructions also include adjusting a cadence band based on the identified gear shift command. The cadence band includes an upper cadence limit and a lower cadence limit. Adjusting the cadence band includes increasing the upper cadence limit, decreasing the lower cadence limit, or increasing the upper cadence limit and decreasing the lower cadence limit. The instructions include controlling the electronic shifting of the bicycle based on the adjusted cadence band.

BRIEF DESCRIPTION OF THE DRAWINGS

Objects, features, and advantages of the present invention will become apparent upon reading the following description in conjunction with the drawing figures, in which.

Figure 1:
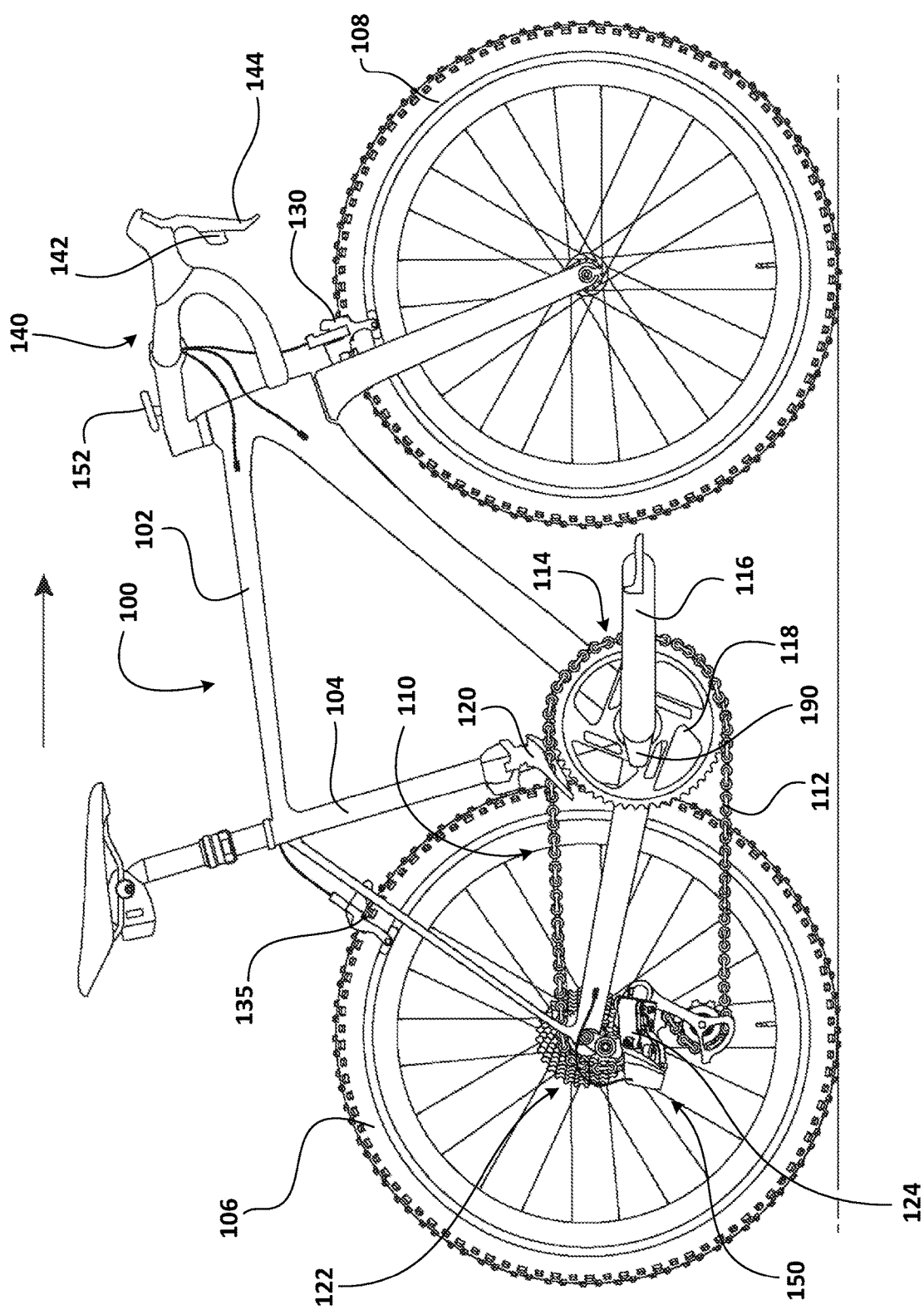
FIG. 1 is a side view of one example of a bicycle with automatic shifting that may be controlled in accordance with the teachings of this disclosure.

Other aspects and advantages of the embodiments disclosed herein will become apparent upon consideration of

DETAILED DESCRIPTION OF THE DISCLOSURE

For bicycle transmissions that utilize electronic shifting, as cadence increases, a controller running an automatic shifting algorithm initiates a gear shift from a first gear to a second gear when the cadence is outside of a cadence band. For an outboard gear shift, when the gear shift occurs, cadence decreases quickly as the rider responds to the gear shift. This quick decrease in cadence can cause the automatic shifting algorithm to initiate a gear shift back to the first gear. This may lead to dithering back and forth between the two gears.

According to the present disclosure, automatic cadence band adjustment is provided to avoid bouncing between gears during automatic shifting. As the cadence increases and, for example, an outboard gear shift occurs, a lower cadence hysteresis band is decreased to prevent an immediate shift in the opposite direction as the rider reacts to the shift. The change in the lower cadence hysteresis band decays back to an original pre-shift value over a period of time to allow the rider to adjust to the new gear. For an inboard gear shift, an upper cadence hysteresis band is increased to avoid an immediate shift in the opposite direction, and the change in the upper cadence hysteresis band decays back to an original pre-shift value over a period of time.

An amount of the change in the cadence hysteresis band and/or a decay time back to the original pre-shift value may be based on a type of the gear shift. The type of gear shift may be defined by a shift direction, which gear is being shifted from, which gear is being shifted to, a number of shifts, and/or a source of a gear shift command. The value of the cadence hysteresis band may vary depending on which gear the rider is in, and/or may be individually set by the rider or may be automatically determined after a number of back and forth shifts occur and are detected as a function of dithering.

In riding scenarios such as when the rider is dumping gears when riding downhill, when the rider is preparing for a climb, and wheelies, for example, a manual override shift may be executed outside of the automatic shifting algorithm. For such a manual override shift, the cadence hysteresis may be increased in an opposite direction of the shift and may decay back to the original pre-shift value over a period of time. This prevents the automatic shifting algorithm from shifting back into the gear the rider was just in, and allows the rider time to ride in non-standard cadence and slowly return to a preferred cadence.

For a multiple gear shift at one time, the increase or decrease in cadence, depending on the direction of the shift, will be larger compared to a single gear shift. The increase and/or decrease of the cadence hysteresis band after the multiple gear shift may be larger than for the single gear shift to allow for this larger change in cadence. Further, the decay time back to the original pre-shift value may be longer for the multiple gear shift than for the single gear shift.

Unlike automatic shifting of the prior art, in which an automatic gear shift can cause a change in cadence that results in an immediate shift in the opposite direction, in the present disclosure, the cadence hysteresis band is changed after a gear shift to allow the rider to adjust to the new gear. This prevents dithering between two different gears and provides for a better riding experience for the rider.

A system control device may be configured so as to be integrated, or coupled, with a bicycle to control bicycle components. The system control device may interface with electromechanically controlled bicycle components so as to trigger an action, such as shifting a rear gear. The system control device may include instructions configured to cause the electromechanically controlled bicycle components to shift between gears automatically (i.e. without specific input or prompting from a rider of the bicycle) based on rider established, or otherwise determined, thresholds, values, parameters, and/or readings from one or more sensors of the bicycle configured to detect characteristics of the bicycle.

Various embodiments of the invention will be described herein with reference to the drawings. It will be understood that the drawings and the description set out herein are provided for illustration only and do not limit the invention as defined by the claims appended hereto and any and all their equivalents. For example, the terms "first" and "second", "front" and "rear", "left" and "right" are used for the sake of clarity and not as terms of limitation. Moreover, the terms refer to bicycle mechanisms conventionally mounted to a bicycle and with the bicycle orientated and used in a standard fashion unless otherwise indicated.

It is to be understood that the specific arrangement and illustrated components of the frame, front wheel, rear wheel, drivetrain, front brake, rear brake, and saddle are non-limiting to the disclosed embodiments. For example, while the front brake and the rear brake are illustrated as hydraulic rim brakes, hydraulic disc brakes are contemplated and encompassed within the scope of the disclosure. Additionally, mechanical systems including mechanical rim brakes and mechanical disk brakes, as well as other electronic, hydraulic, pneumatic, and mechanical systems, or combinations thereof, such as suspension systems, are contemplated and encompassed within the scope of the present disclosure.

FIG. 1 generally illustrates a bicycle 100 with which one or more system control devices 150 may be used to implement a bicycle control system using the methods described herein. The bicycle 100 includes a frame 102, front and rear wheels 108, 106 rotatably attached to the frame 102, and a drivetrain 110. A front brake 130 is provided for braking the front wheel 108, and a rear brake 135 is provided for braking the rear wheel 106. The drivetrain 110 includes a chain 112, a front crank assembly 114 including a crank 116, one or more chainrings 118, a front derailleur 120 that may be attached to a seat tube 104 or another portion of the frame 102, a rear sprocket assembly 122 coaxially mounted to the rear wheel 106 and a rear derailleur 124. In the displayed embodiment, the drivetrain 110 involves electro-mechanical operation of the front derailleur 120 and/or the rear derailleur 124. In an embodiment, the drivetrain 110 may involve only a single front chainring 118, and may thus not include the front derailleur 120.

A handlebar assembly 140 is attached to the frame 102 for user, or rider, control of the bicycle 100. The handlebar assembly may include a manual shift control device 142. One or more manual shift control devices 142 (e.g. buttons or levers) may be used with the bicycle. The manual shift control devices 142 are configured to actuate or otherwise control components of the bicycle 100. For example, the manual shift control device may be configured to control gear shifting of the front derailleur 120 and/or the rear derailleur 124. The manual control devices may also be configured to control characteristics of a suspension system (not shown). The handlebar assembly 140 may also include a brake lever 144 that is configured to operate the front brake 130. The rear brake 135 is operated by a brake lever (not shown) also located on the handlebar assembly 140.

The bicycle 100 may also include one or more cadence sensors and/or power meters. As shown in the example of FIG. 1, a device 190 includes a cadence sensor integrated into a power meter. In other embodiments, the cadence sensor and the power meter are separate devices. Cadence may be measured directly from the crank and/or determined from the known gear, wheel size, speed of the bike during pedaling, or using other techniques. A separate power meter may be crank based, chainring spider based, hub based, or any type of power meter operational to provide an indication of the power input and/or output of the bicycle. A speed sensor may also be included. The speed sensor may be a wheel speed sensor, a global positioning system device, or any other type.

The manual shift control devices 142 are part of a bicycle control system, or control system, that includes a system control device 150 configured for causing the rear 124 and/or front derailleur 120 to shift between gearing combinations of the bicycle 100 using manual control as described above, or through automatic control based on user defined values and/or bicycle sensor readings of bicycle characteristics. As shown in FIG. 1, the system control device 150 is integrated into the rear derailleur 124. The system control device 150, however, may be integrated with other components, such as the manual control device(s) 142, as a standalone device, or combinations thereof using parallel and/or joint processing techniques. For example, the system control device 150 may be integrated with, or configured to control, one or more internal gear hubs of a drivetrain of a bicycle.

Figure 2:
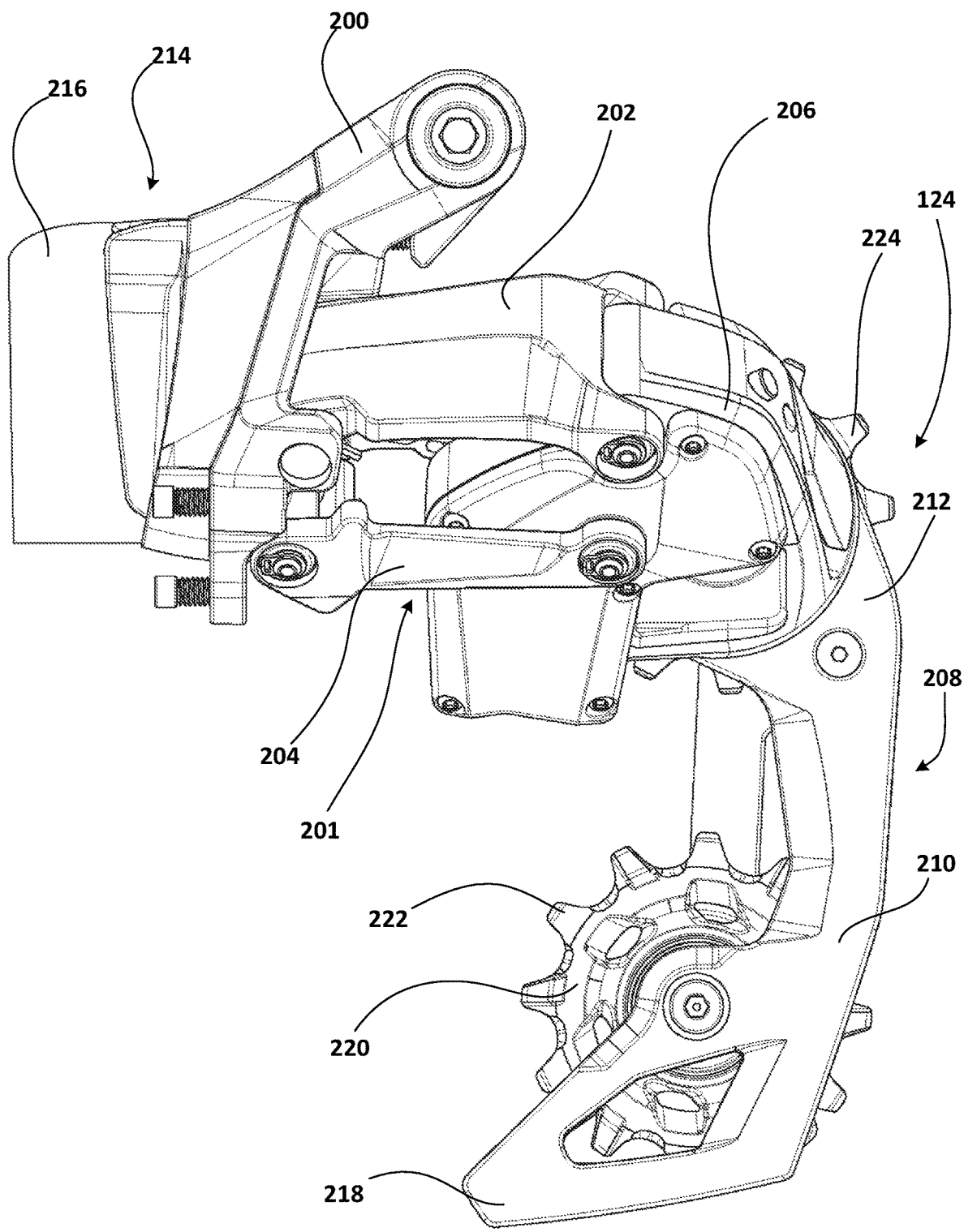
FIG. 2 is a side view of one example of a rear derailleur.

Referring to FIG. 2, the rear derailleur 124 is depicted in these examples as a wireless, electrically actuated rear derailleur mountable to the frame 102 of the bicycle 100. The electric rear derailleur 124 has a base member 200 (e.g., a b-knuckle) that is mountable to the bicycle frame 102. A linkage 201 has two links, an outer link 202 and an inner link 204, that are pivotally connected to the base member 200. A movable member 206 (e.g., a p-knuckle) is connected to the linkage 201. A chain guide assembly 208 (e.g., a cage) has a cage plate 210 with a proximal end 212 that is pivotally connected to a part of the movable member 206, as described further below.

A motor module 214 is carried on the electric rear derailleur 124 and has a battery 216. The battery 216 supplies power to the motor module 214. In one example, as illustrated in FIG. 2, the motor module 214 is located in the base member 200. However, the motor module 214 may instead be located elsewhere, such as in the outer link 202 or the inner line 204, or in the movable member 206. The motor module 214 may include, though not shown herein, a gear mechanism or transmission. As is known in the art, the motor module 214 and gear mechanism may be coupled with the linkage 201 to laterally move the cage plate 210 and thus switch the chain 112 among the rear sprockets on the rear sprocket assembly 122.

The cage plate 210 also has a distal end 218 that carries a tensioner cog or wheel 220 (e.g., a tensioner wheel). The tensioner wheel 220 also has teeth 222 around a circumference. The cage plate 210 is biased in a chain tensioning direction to maintain tension in the chain 112. The chain guide assembly 208 may also include a second cog or wheel, such as a guide wheel 224 disposed nearer the proximal end 212 of the cage plate 210 and the movable member 206. In operation, the chain 112 is routed around one of the rear sprockets. An upper segment of the chain 112 extends forward to the chainring 118 or a front sprocket assembly and is routed around one or the front sprocket. A lower segment of the chain 112 returns from the chainring 118 or the front sprocket assembly to the tensioner wheel 220 and is then routed forward to the guide wheel 224. The guide wheel 224 directs the chain 112 to the rear sprockets. Lateral movement of the cage plate 210, the tensioner wheel 220, and the guide wheel 224 may determine the lateral position of the chain 112 for alignment with a selected one of the rear sprockets.

Referring to FIG. 1, a control unit 152 may be mounted to the handlebar assembly 140 for actuating the motor module 214 and operating the rear derailleur 124 for executing gear changes and gear selection. The control unit 152, however, may be located anywhere on the bicycle 100 or, alternatively, may be distributed among various components of the bicycle 100, with routing of a communication link to accommodate necessary signal and power paths. The control unit 152 may also be located other than on the bicycle 100, such as, for example, on a rider's wrist or in a jersey pocket. The communication link may include wires, may be wireless, or may be a combination thereof. In one example, the control unit 152 may be integrated with the rear derailleur 124 to communicate control commands between components. The control unit 152 may include a processor, a memory, and one or more communication interfaces.

The battery 216 may instead be an alternate power supply or power source and may operate other electric components of the bicycle 100 within a linked system. The battery 216 or other power supply may also be located in other positions, such as attached to the frame 102. Further, multiple power supplies may be provided, which may collectively or individually power the electric components of the system, including the rear derailleur 124, such as a drive motor for an embodiment involving an electrically powered bicycle. In this example, however, the battery 216 is configured to be attached directly to the rear derailleur 124, and to provide power only to the components of the rear derailleur 124.

While the illustrated bicycle 100 is a road bike, the present invention has applications to bicycles of any type, including fully or partially suspensioned mountain bikes and others, as well as bicycles with mechanical (e.g., cable, hydraulic, pneumatic) and non-mechanical (e.g., wired, wireless) drive systems. For example, the illustrated handlebar assembly 140 involves a drop bar configuration; however, the shift control device 142 and/or bicycle control system may be used with other types of handlebar assemblies as well, such as aero-bars, bullhorn bars, riser bars, or any other type of bicycle handlebar. For example the shift control device 142 may be a button integrated with an aero-bar configuration. Also, while the embodiments described herein describe manual control devices attached to handlebars, a person having experience in the art would recognize the possible positioning of control devices at other areas of a bicycle, such as locations throughout the frame 102 or other locations.

Figure 3:
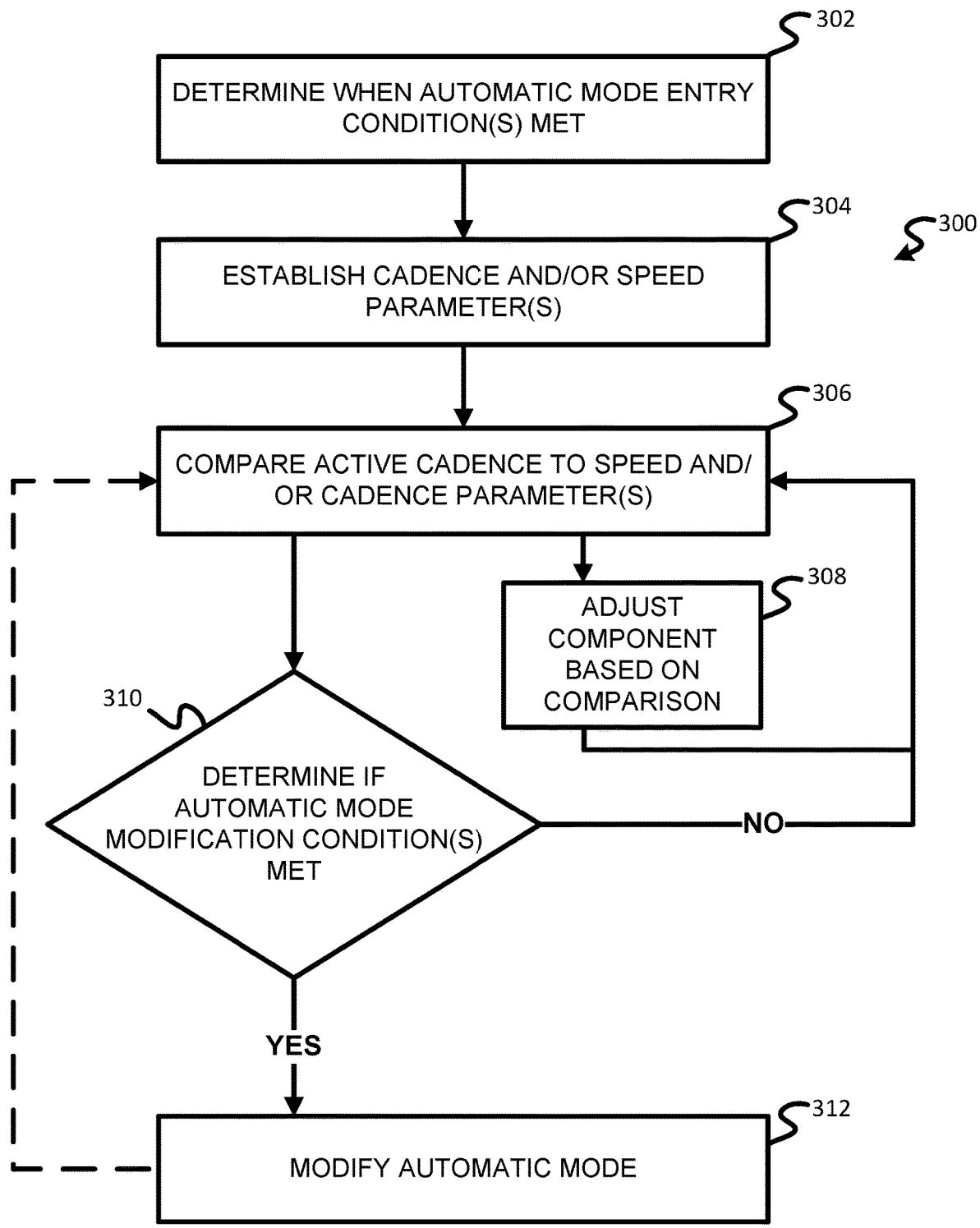
FIG. 3 is a flow chart of an embodiment of a method for controlling a bicycle.
Figure 4:
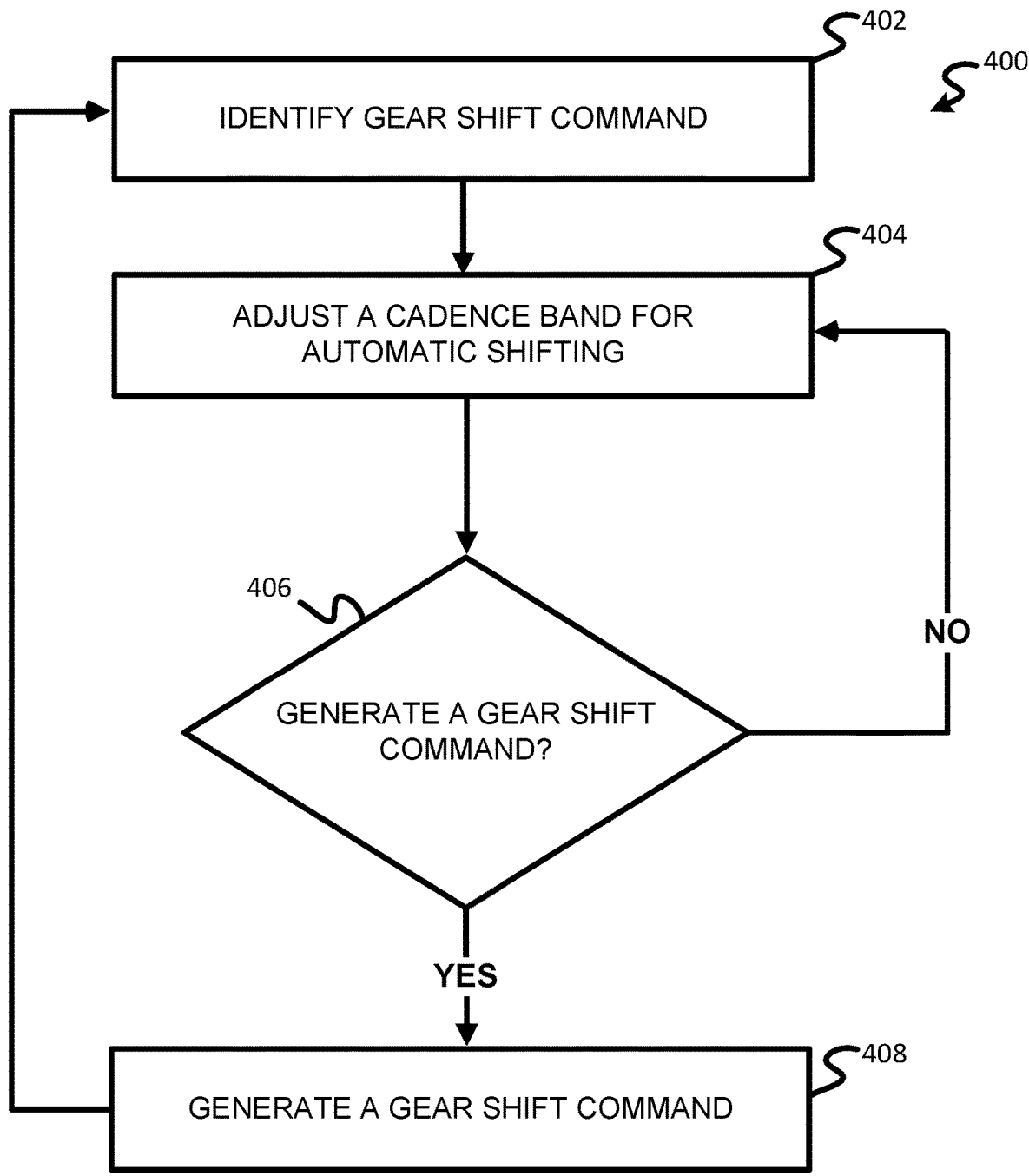
FIG. 4 is a flow chart of an embodiment of a method for modifying an automatic shifting mode.

FIG. 3 illustrates a flow chart of an embodiment for a method 300 of controlling a bicycle, particularly as related to an automatic, or automatic shifting, mode of a bicycle and/or bicycle component(s). FIG. 4 illustrates a flow chart of an embodiment of a method 400 for controlling an automatic shifting mode of a bicycle. As presented in the following, acts may be performed using any combination of the components indicated in FIGS. 1, 2, 9, and/or 10. For example, the following acts may be performed by a processor, as integrated with a system control device 150 that may be integrated with one or more bicycle components 124 and/or 102. Additional, different, or fewer acts may be provided. The acts are performed in the order shown or other orders. The acts may also be repeated and/or performed at multiple times throughout the method. For example, a cadence band for control of electronic shifting may be adjusted each time a new gear shift command is identified.

An automatic shifting system may be configured, such as with appropriate sensors or other devices, to monitor and/or detect system parameters to be used for system control. For example, the automatic shifting system may use one or more of cadence, power, and/or speed measurement to control shifting of the transmission.

Some initial parameters that may, for example, be established include any combination of the following. Cadence is a rotation of the cranks as measured in, for example, revolutions per minute ("RPM"). Default cadence or nominal cadence is a preferred cadence established by, for example, the rider. The default cadence may be established by the rider during or prior to riding. A cadence band is a set range of cadences where the system will stay within a same gear. The cadence band may include an upper cadence limit and/or a lower cadence limit. The system may shift outboard (e.g., to a harder gear) when the measured cadence is higher than the upper cadence limit and may shift inboard (e.g., to an easier gear) when the measured cadence is lower than the lower cadence limit. Inboard modifier or lower cadence limit modifier is a modifier applied to the lower cadence limit when a gear shift is identified. Outboard modifier or upper cadence limit modifier is a modifier applied to the upper cadence limit when a gear shift is identified. Decay factor defines how quickly the upper cadence limit and/or the lower cadence limit returns to an original value after the corresponding modifier is applied to the upper cadence limit and/or the lower cadence limit. Update period defines a frequency at which the upper cadence limit and/or the lower cadence limit is updated during the return to the original value after modification.

The parameters are used, either independently or in combination, by the system control device to control the automatic shifting system of the bicycle, for example as is indicated in the flow charts provided in FIGS. 3 and 4.

In act 302, the system control device determines if one or more automatic mode entry conditions are met. The automatic mode entry conditions may be any criteria operable to indicate an intent to enter an automatic mode of a component of the bicycle. In an embodiment, one or more buttons may be enacted (e.g. depressed or actuated) for a period of time. The buttons may be multiple purpose buttons, such as electronic shifting devices, configured as levers, plunger type buttons, rocker type buttons, or any other electronic actuation device. For example, the buttons may be typically used to indicate that a component, such as one or more bicycle derailleurs, is to shift a chain of the bicycle to a different gear, but when actuated in combination for at least three seconds, the system control device causes the component to enter into automatic mode. Other actuation time periods and/or other multi-purpose button based initiation techniques may also be used. For example, multiple system control buttons may be provided, such as manual shift control devices for electronic derailleurs.

In an embodiment, individual buttons of the multi-purpose buttons may have three or more actuating effects. In an embodiment, at least one button is provided for controlling a rear derailleur of a bicycle. A first button actuated (e.g., in a first direction) causes a rear derailleur to change the bicycle chain to a larger sized sprocket. The first button actuated in a second way (e.g., in a second direction) or a second button actuated independently causes the rear derailleur to change the bicycle chain to a smaller sized sprocket. The first button and/or the second button actuated for a length of time causes the system control device to enter into an automatic shifting mode. For example, the length of time may be three seconds. In an embodiment, the first button and/or the second button may provide a button release signal when the respective button is released by a user, and the absence of a button release signal within a period of time may trigger entry into an automatic shifting mode of the system control device.

In another embodiment, a bicycle speed may be monitored by the system control device using a speed determination device, such as a wheel speed sensor. When the system control device determines that the bicycle speed, such as is indicated by a wheel speed in this example, is above a minimum value, the system control device causes the component to enter into automatic mode.

In act 304, cadence and/or speed parameters are established. The cadence and/or speed parameters may be established using any technique. The speed and/or cadence parameters are used by the system control device to determine when an automatic adjustment, such as a shift using a derailleur, is to be enacted. In an embodiment, one or more cadence parameters are determined by the system control device using a cadence sensor and/or a wheel speed sensor. The system control device measures or estimates a cadence of the bicycle for a period of time, and establishes a value derived from the measured or estimated cadence over that time as the cadence parameter. The derived value may be any value characteristic of the cadence over the period of time. For example, the derived value may be an average, mode, or mean value for the cadence over the period of time. Also, the period of time may be an established or referenced period of time. In an embodiment, the period of time is equal to a period of time a button is actuated. For example, if two buttons are actuated for three seconds to cause the system control device to enter into an automatic mode, the system control device records values using the cadence sensor, during the time the two buttons are actuated to gather data for deriving the cadence value to establish.

In an embodiment, the system control device gathers cadence data over a period of time and determines multiple values, such as a mean and a standard deviation of the cadence over that time. The mean value and the standard deviation value may be used to establish an operations range for the automatic mode. For example, the upper cadence limit and the lower cadence limit may be established from the mean value and the standard deviation value to determine characteristics of automatic shifting mode shifts. The upper cadence limit and the lower cadence limit may also be determined using other techniques. For example, an average cadence may be determined over a period of time; the upper cadence limit may be established as a pre-set cadence value higher than the average cadence, and the lower cadence limit may be established as a preset cadence value lower than the average cadence. The preset values may be the same or different for the setting of the upper cadence limit and the lower cadence limit.

In another embodiment, one or more predetermined cadence parameters are saved in a memory of the system control device, and the one or more predetermined cadence parameters are established as the cadence and/or speed parameters. For example, a set of an upper cadence limit and a lower cadence limit may be manually input into the memory before riding or may be stored in the memory during riding (e.g., a prior bicycle ride) of the system control device.

In act 306, the system control device compares active cadence and/or speed parameters to cadence and/or speed parameters established in act 304. The comparison may be executed using any technique that may qualify an active cadence and/or speed of the bicycle against the established cadence and/or speed parameters. In an embodiment, a current measured speed and/or cadence value is compared to the upper cadence limit and the lower cadence limit established in act 304. For example, the upper cadence limit and the lower cadence limit may be established in act 304, and a trailing time average of cadence values recorded for a period of time (e.g., the last one second) may be compared against the upper cadence limit and the lower cadence limit. In other words, the system control device may determine whether the trailing time average of cadence values is within a predetermined cadence band defined by the upper cadence limit and the lower cadence limit, and if the trailing time average of cadence values is outside the predetermined cadence band, determine whether the trailing time average of cadence values is greater than the upper cadence limit or less than the lower cadence limit. This comparison may be repeated periodically or conducted continuously by the system control device during automatic mode operation.

In act 308, the system control device adjusts a component based on the comparison performed in act 306. In an embodiment, the system control device causes the rear derailleur to change a gear of the bicycle based on the comparison performed in act 306. For example, the system control device shifts to an easier gear when a detected cadence reaches and/or goes below the lower cadence limit, and/or the system control device shifts to a harder gear when the detected cadence reaches and/or goes above the upper cadence limit.

In act 310 the system control device determines if one or more automatic mode modification conditions (e.g., identification of a gear shift command) are met. Automatic mode modification conditions are conditions that when met trigger an altering or change of an operating parameter of the automatic mode. In an embodiment, the automatic mode modification conditions are conditions that, when met subsequent to the establishment of cadence and/or speed parameters in act 304, trigger an altering or change of the operating parameter of the automatic mode. In an embodiment, multiple automatic mode modification conditions are used to alter or change the operating parameters of the automatic mode. Further, detecting and/or determining the multiple modification conditions (act 310), and subsequent modification of automatic mode (act 312), as described further below, may occur at different positions of the indicated sequence. For example, the determining and/or modifying may occur after the establishment of the cadence and/or speed parameters (act 304), but before the comparing of the active cadence and/or speed (act 306).

Different actions and/or measured values may be an automatic mode modification condition. In an embodiment, operating a manual control that is not necessary for automatic mode may be an automatic mode modification. For example, a button depression, such as a depression of a shifting multi-use button described above, may be an automatic mode modification condition. While the system control device is operating in automatic mode (e.g., causing at least one bicycle shifting component to shift gears based on cadence and/or speed parameters), there is no need to manually depress a shifting button to indicate a shift. A manual shift button depression during the automatic mode operation may be interpreted as indicating intent to change a parameter of the automatic mode, such as the system control device disengaging or pausing automatic mode.

Other actions and/or measured values may be automatic mode modification conditions. In an embodiment, one or more cadence values are automatic mode modification conditions. For example, a cadence sensor, such as a crank or crank arm sensor, may be used to provide a bicycle cadence to the system control device, and when the cadence value indicated by the cadence sensor drops below the lower cadence limit or rises above the upper cadence limit (e.g., initiating a gear change within the automatic mode), this measured value or initiated action (e.g., gear change) may be an automatic mode modification condition.

In act 312 the control device modifies the automatic mode of the component based on the determination in act 310. The modification may be to any operational parameter of the automatic mode. For example, the modification may be to the upper cadence limit and/or the lower cadence limit, or other operational parameters. In an embodiment, a modification condition involving a depression of a shift button during automatic mode operation may cause the system control device to increase the upper cadence limit and/or decrease the lower cadence limit.

In an embodiment, a modification condition involving a slow speed during automatic mode operation may cause the system control device to pause or end the automatic mode operation. In an embodiment, a modification condition involving a slow cadence during automatic mode operation may cause the system control device to pause or end the automatic mode operation. Any parameter described herein may be modified based on the determination and/or detection of any particular modification condition described herein.

In an embodiment, subsequent to, or concurrent with, modifying an automatic mode parameter (e.g. modifying the lower cadence limit and/or the upper cadence limit) (act 312), the system control device continues to operate in the automatic mode with the modified parameters.

Further description of the provided functions, automatic mode parameters, modification conditions, and other embodiments of the control system are described below. These functions, automatic mode parameters, and modification conditions may be implemented in an embodiment in any combination or as specifically described herein.

FIG. 4 illustrates a flow chart for an embodiment of a method for modifying an automatic shifting mode. In the embodiment shown in FIG. 4, an instantaneous cadence may be set, or established, upon starting or initiating automatic mode. In the embodiment, automatic shifting starts with pushing or otherwise actuating an up shift button and/or a down shift button for a period of time, such as three seconds. This time is variable and may be anything longer than a normal shift time. The system control device records the cadence of the rider during the three seconds, for example. The system control device sets the upper cadence limit and the lower cadence limit (e.g., a cadence band and a cadence range). The cadence is measured and compared with the cadence band, and the system control device may shift gears based on the comparison (e.g., if the measured cadence is outside of the cadence band). If either shift button is manually pushed or otherwise actuated or the system control device shifts gears based on the comparison (e.g., modification conditions), one or more automatic mode parameters are modified.

In act 402, the system control device (e.g., the system control device 150) identifies a gear shift command. In one embodiment, identifying the gear shift command includes the system control device generating the gear shift command based on the measured cadence being outside the cadence band or receiving a control signal from a control mechanism of a manual control device (e.g., either shift button; manual shift control device 142 of FIG. 1). In other words, the identified gear shift command may be generated by the system control device in response to a rider of the bicycle being outside of a cadence band during automatic mode, or may be received from the rider of the bicycle via interaction with, for example, a shift button or lever.

In one embodiment, the system control device determines a type of the gear shift command. For example, the system control device determines, based on the identified gear shift command (e.g., data within the identified gear shift command), a shift direction (e.g., a direction a motor for shifting is to turn), a number of shifts (e.g., an amount of time the motor is turned on), a source of the gear shift command, or any combination thereof. The determined source of the gear shift command may be, for example, the control mechanism of the manual control device or the system control device itself (e.g., generating the gear shift command in response to the measured cadence being outside the cadence band).

In act 404, the system control device adjusts a cadence band for automatic shifting of the bicycle based on the gear shift command identified in act 402. The cadence band includes an upper cadence limit and a lower cadence limit. Adjusting the cadence band includes increasing the upper cadence limit and/or decreasing the lower cadence limit. The system control device determines whether to increase the upper cadence limit and/or decrease the lower cadence limit based on the shift direction.

For example, the system control device at least changes the cadence limit in an opposite direction of the shift direction: The system control device at least decreases the lower cadence limit when the shift direction is outboard, and the system control device at least increases the upper cadence limit when the shift direction is inboard. In other words, when an outboard shift occurs, the measured cadence may decrease quickly as the rider reacts to the shift to a harder gear. The decreased lower cadence limit in response to the gear shift to a harder gear prevents an immediate shift by the automatic mode in the opposite direction (e.g., back into the previous gear before the shift). When an inboard shift occurs, the measured cadence may increase quickly as the rider reacts to the shift to an easier gear. The increased upper cadence limit in response to the gear shift to an easier gear prevents an immediate shift by the automatic mode in the opposite direction (e.g., back into the previous gear before the shift).

As discussed further below with reference to acts 404 and 406, the system control device increases the upper cadence limit from a first upper cadence limit (e.g., the upper cadence limit prior to the shift) to a second upper cadence limit and/or decreases the lower cadence limit from a first lower cadence limit (e.g., the lower cadence limit prior to the shift) to a second lower cadence limit. After the initial increase and/or decrease, the system control device then decreases the upper cadence limit from the second upper cadence limit towards the first upper cadence limit (e.g., to the first upper cadence limit) over a first time period and/or increases the lower cadence limit from the second lower cadence limit towards the first lower cadence limit (e.g., to the first lower cadence limit) over a second time period. In other words, the upper cadence limit and/or the lower cadence limit decays back to a respective original value prior to the shift.

In one embodiment, the system control device identifies an upper cadence limit modifier, a lower cadence limit modifier, a first decay factor (e.g., an upper cadence limit decay factor), a second decay factor (e.g., a lower cadence limit decay factor), or any combination thereof based on the gear shift command identified in act 402. The first decay factor is for the decreasing of the upper cadence limit from the second upper cadence limit to the first upper cadence limit over the first time period. The second decay factor is for the increasing of the lower cadence limit from the second lower cadence limit to the first lower cadence limit over the second time period.

For example, the system control device, after identifying the gear shift command in act 402, sets the upper cadence limit and/or the lower cadence limit based on the upper cadence limit modifier, the lower cadence limit modifier, the first decay factor, the second decay factor, or any combination thereof. The system control device updates the upper cadence limit and/or the lower cadence limit at an update period (e.g., a predetermined update period). The predetermined update period may be set at manufacture of the bicycle, set at manufacture of the system control device, and/or defined by the rider. In one embodiment, the predetermined update period is 500 ms, though other predetermined update periods may be used.

For an outboard shift (e.g., to a more difficult gear), for example, the system control device may use the following equation to determine and set the lower cadence limit for the automatic mode:

$$S_i = C_t + H_n * (m_i * n^{T_{ls}}) \quad (1)$$

where $S_i$ is the inboard setpoint (e.g., the lower cadence limit), $C_t$ is the target cadence (e.g., a nominal cadence), $H_n$ is the nominal hysteresis (e.g., corresponding to the first lower cadence limit), $m_i$ is the inboard modifier, n is a scaler (e.g., decay factor), and $T_{ls}$ is a number of time periods since last shift.

In one embodiment, the determination of the lower cadence limit is not based on an exponential equation, as shown above in Equation (1), but is based on a linear equation. In other words, after the system control device decreases the lower cadence limit from the first lower cadence limit to the second lower cadence limit after the shift is identified in act 402, the system control device increases the lower cadence limit from the second lower cadence limit to the first lower cadence limit over the second time period.

The system control device may update and store a time period since last shift after each update period (e.g., 500 ms) and/or a number of update periods since last shift. The system control device may reset the time period since last shift and/or the number of update periods since last shift when a new shift is identified in act 402.

In one embodiment, the system control device may also adjust the upper cadence limit for the automatic mode when an outboard shift is identified in act 402. For example, the system control device may use the following equation to determine and set the upper cadence limit for the automatic mode when an automatic outboard shift is identified in act 402:

$$S_o = C_t + H_n * (m_o * n^{T_{ls}}) \quad (2)$$

where $S_o$ is the outboard setpoint (e.g., the upper cadence limit), and $m_o$ is the outboard modifier. The outboard modifier may be less than the inboard modifier when an outboard shift identified in act 402.

In one embodiment, the determination of the upper cadence limit is not based on an exponential equation, as shown above in Equation (2), but is based on a linear equation. In other words, after the system control device increases the upper cadence limit from the first upper cadence limit to the second upper cadence limit after the shift is identified in act 402, the system control device decreases the upper cadence limit from the second upper cadence limit to the first upper cadence limit over the first time period.

In one embodiment, after the outboard shift is identified in act 402, the system control device may adjust the inboard setpoint $S_i$ (e.g., the lower cadence limit) and the outboard setpoint $S_o$ (e.g., the upper cadence limit) for the automatic mode using the equations above, a nominal cadence of 75 or 80, an inboard modifier of three, an outboard modifier of 1.5, a decay factor of 0.8, and an update period of 500 ms. Other values for one or more of the variables within the equations above may be used.

Figure 5:
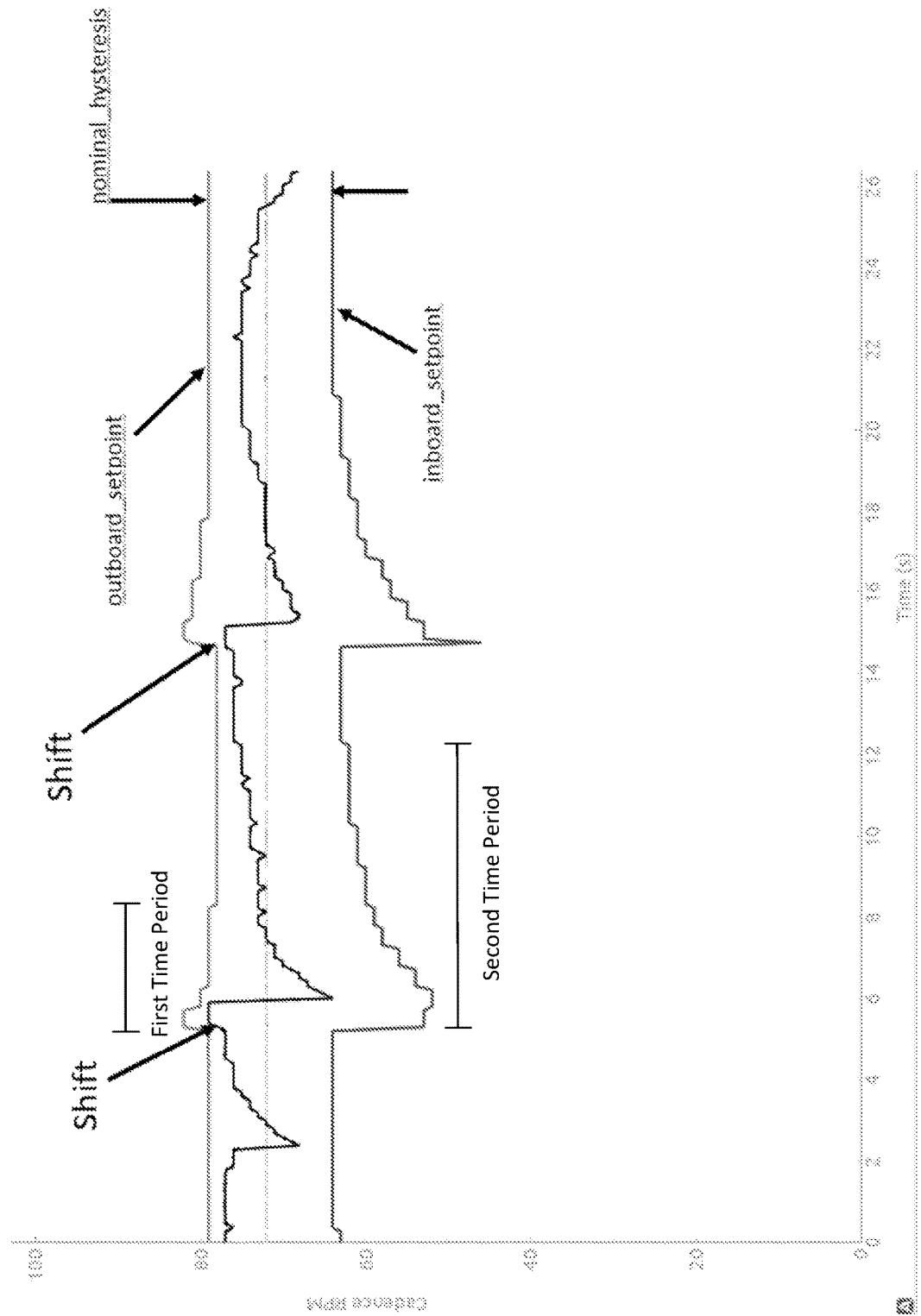
FIG. 5 is a graph of cadence over time for exemplary outboard shifts.

FIG. 5 shows an exemplary plot of cadence over time with adjustments to the outboard setpoint (e.g., upper cadence limit) and the inboard setpoint (e.g., lower cadence limit) with two different outboard shifts, respectively. The adjustments to the lower cadence limit prevent a gear shift back to a gear from which the bicycle was shifted. As shown in FIG. 5, when the shift direction is outboard, the second time period and a difference between the first lower cadence limit and the second lower cadence limit are greater than the first time period and a difference between the second upper cadence limit and the first upper cadence limit, respectively. In other words, there is a bigger change to the lower cadence limit and the lower cadence limit takes longer to decay back to an original value compared to the upper cadence limit when the shift direction is outboard.

When an inboard shift is identified in act 402, the same equations may be used, but different modifier values may be used. For example, when an inboard shift is identified in act 402, the outboard modifier may be 3.0, and the inboard modifier may be 1.5. Other values may be used.

Figure 6:
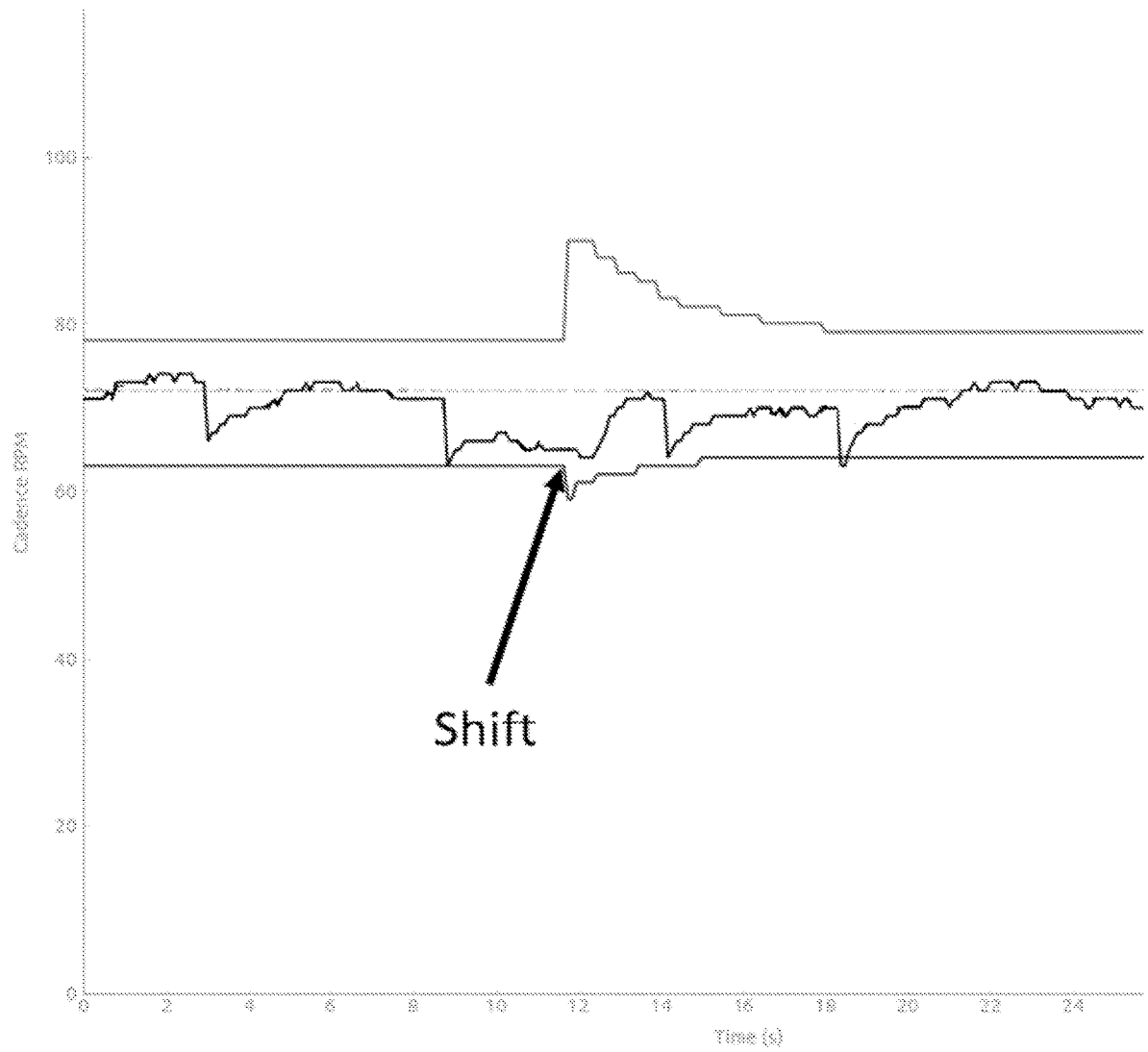
FIG. 6 is a graph of cadence over time for an exemplary inboard shift.

FIG. 6 shows an exemplary plot of cadence over time with adjustments to the outboard setpoint and the inboard setpoint with a single inboard shift. The adjustment to the upper cadence limit prevents a gear shift back to a gear from which the bicycle was shifted. As shown in FIG. 6, when the shift direction is inboard, the first time period and the difference between the second upper cadence limit and the first upper cadence limit are greater than the second time period and the difference between the first lower cadence limit and the second lower cadence, respectively.

A memory of the system control device may store values for the upper cadence limit modifier, the lower cadence limit modifier, the first decay factor, the second decay factor, or any combination thereof, and the system control device may retrieve the values based on the gear shift command identified in act 402. The values may be stored in the memory in any number of ways including, for example, in a look-up table. The values may be stored in the memory in other ways.

The values for the upper cadence limit modifier, the lower cadence limit modifier, the first decay factor, the second decay factor, or any combination thereof may differ within, for example, the look-up table based on a gear from which the bicycle is being shifted, a gear to which the bicycle is being shifted, a number of gears being shifted at once, a direction of the shift (e.g., inboard or outboard), and/or other parameters or types of gear shifts. For example, the upper cadence limit modifier and the lower cadence limit modifier may be different for each gear into which the bicycle is being shifted. In other words, the system control device may adjust the upper cadence limit and/or the lower cadence limit different predetermined amounts (e.g., based on parameter values stored in the look-up table in the memory) based on the gears into which the bicycle is being shifted, respectively.

The values for the upper cadence limit modifier, the lower cadence limit modifier, the first decay factor, the second decay factor, or the respective combination thereof within, for example, the look-up table may be user-defined, set at manufacture, and/or learned by the system control device as the rider rides and shifts gears. In one embodiment, the processor of the system control device stores historical data related to rider response to gear changes in the memory of the system control device. For example, the rear derailleur is allowed to shift back and forth between gears within the automatic mode (e.g., allowed to dither back and forth between gears as the rider reacts to gear shifts), and the memory stores data related to cadence changes by the rider after different gear shifts. The processor may determine the upper cadence limit modifier, the lower cadence limit modifier, the first decay factor, the second decay factor, or any combination thereof to be stored within, for example, the look-up table based on the stored historical data. The processor may determine a single upper cadence limit modifier, a single lower cadence limit modifier, a single first decay factor, and a single second decay factor for all gear shifts, or may determine an upper cadence limit modifier, a lower cadence limit modifier, a first decay factor, and a second decay factor for each possible gear shift or a number of possible gear shifts.

In one embodiment, after a predetermined number of gear shifts and using corresponding stored historical data, the processor may set the values for the upper cadence limit modifier, the lower cadence limit modifier, the first decay factor, the second decay factor, or any combination thereof within, for example, the look-up table. As an example, for a first outboard gear shift from a first gear to a second gear, the processor may set the lower cadence limit modifier for the first outboard gear shift such that all dithering back and forth between the first gear and the second gear within the stored historical data would have been prevented. For example, if the historical data includes cadence data for ten occurrences of the first outboard gear shift from the first gear to the second gear and the greatest drop in cadence in response to the first outboard gear shift is twenty (20) RPM, the processor may set the lower cadence limit modifier to avoid dithering at such a drop in cadence (e.g., 22 RPM). The other values (e.g., for the upper cadence limit modifier, the first decay factor, and/or the second decay factor) may be determined in a similar way.

In one embodiment, the system control device may determine, based on the identified gear shift command, that the number of shifts at one time is two or more. For example, the identified gear shift command may instruct the rear derailleur to shift from the first gear to a third gear. The second gear may be immediately outboard relative to the first gear, and the third gear may be immediately outboard relative to the second gear. A greater decrease in the lower cadence limit may be needed to prevent dithering between gears, as the two-gear gear change may have a greater effect on the rider cadence. When the determined shift direction is outboard, for example, the second time period and the difference between the first lower cadence limit and the second lower cadence limit when the determined number of shifts is two or more may be greater than the second time period and the difference between the first lower cadence limit and the second lower cadence limit when the determined number of shifts is one, respectively. In other words, the lower cadence limit modifier may be greater for the two or more gears gear shift compared to the single gear gear shift. In one embodiment, the second decay factor may be greater for the two or more gears gear shift compared to the single gear gear shift. The same applies for the upper cadence limit and the first time period for inboard gear shifts of two or more gears. The look-up table, for example, may include values for the upper cadence limit modifier, the lower cadence limit modifier, the first decay factor, the second decay factor, or any combination thereof, respectively, for multiple-gear gear shifts.

In one embodiment, the system control device may determine, based on the identified gear shift command, that the source of the gear shift command is the control mechanism of the manual control device (e.g., a shifter or shifting device). The rider may, for example, request a manual override shift, and the system control device prevents a shift back to the gear from which the bicycle was shifted by adjusting the lower cadence limit and/or the upper cadence limit. This allows the rider time to ride in a non-standard cadence, and then, return to a preferred cadence (e.g., the target cadence). For example, the rider may initiate a gear shift outside of the automatic mode to stand up and stretch before resuming a previous ride, to dump gears before going downhill, to prepare for a climb, or to prepare for a wheelie.

In one embodiment, the values for the upper cadence limit modifier, the lower cadence limit modifier, the first decay factor, the second decay factor, or any combination thereof may be the same for a gear shift command generated by the processor (e.g., as part of the automatic mode) and a gear shift command generated by the rider via actuation of the control mechanism of the manual control device. In another embodiment, when the determined shift direction is outboard, for example, the second time period and the difference between the first lower cadence limit and the second lower cadence limit are greater when the determined source of the gear shift command is the control mechanism of the manual control device compared to when the determined source of the gear shift command is the processor. In other words, when the source of the gear shift command is the control mechanism of the manual control device, the lower cadence limit, for example, is adjusted more and for longer compared to when the source of the gear shift command is the processor of the system control device as part of the automatic mode. The same applies for the upper cadence limit and the first time period for inboard gear shifts initiated by the rider via the control mechanism of the manual control device. The look-up table, for example, may include values for the upper cadence limit modifier, the lower cadence limit modifier, the first decay factor, the second decay factor, or any combination thereof, respectively, for both processor-initiated shifts as part of the automatic mode and rider-initiated shifts outside of the automatic mode.

Figure 7:
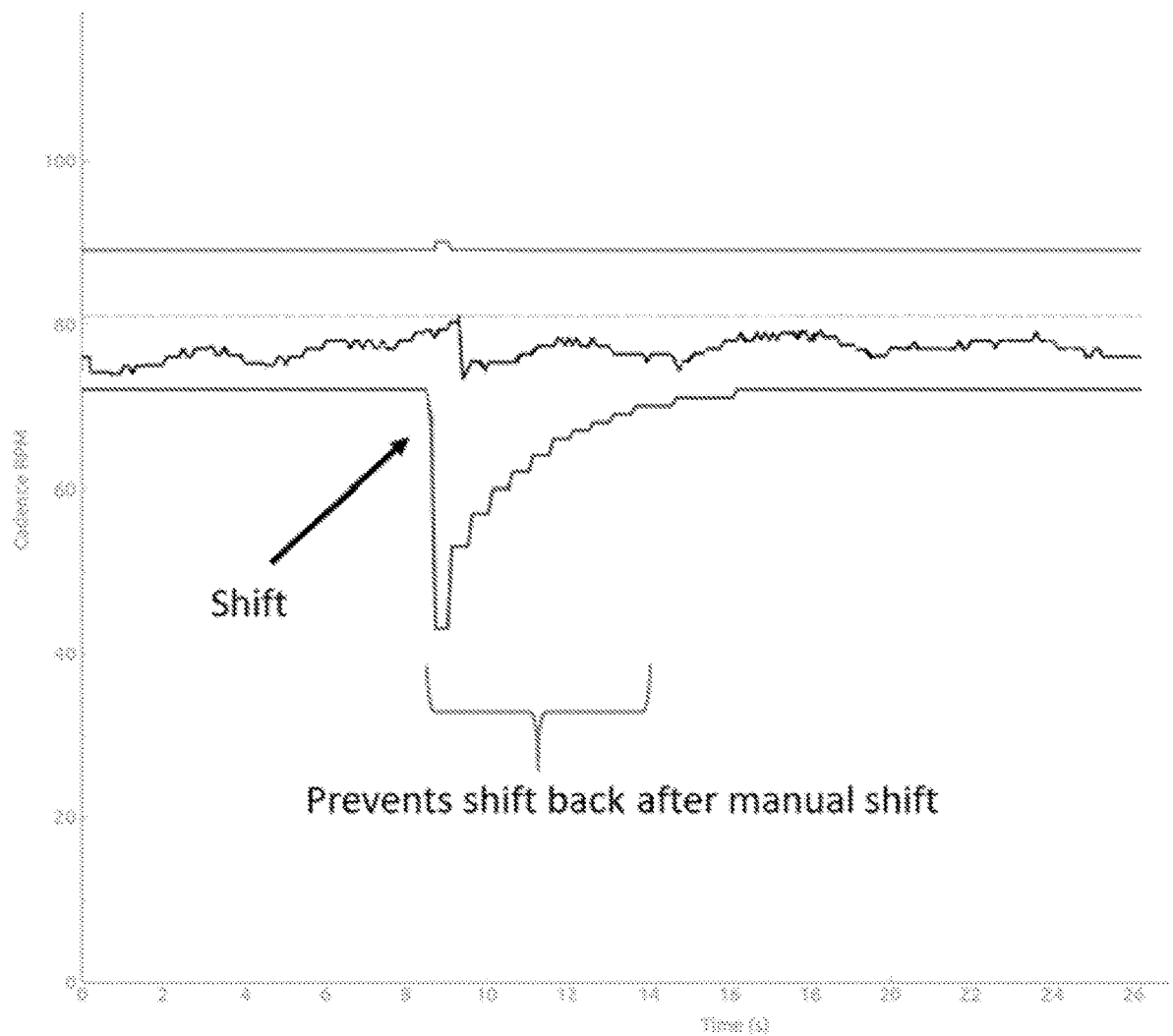
FIG. 7 is a graph of cadence over time for an exemplary manual outboard shift.

FIG. 7 shows an exemplary plot of cadence over time with adjustments to the outboard setpoint (e.g., lower cadence limit) and the inboard setpoint (e.g., upper cadence limit) with a single outboard shift initiated by the rider outside of the automatic mode. The adjustment to the lower cadence limit prevents a gear shift back to a gear from which the bicycle was shifted.

Figure 8:
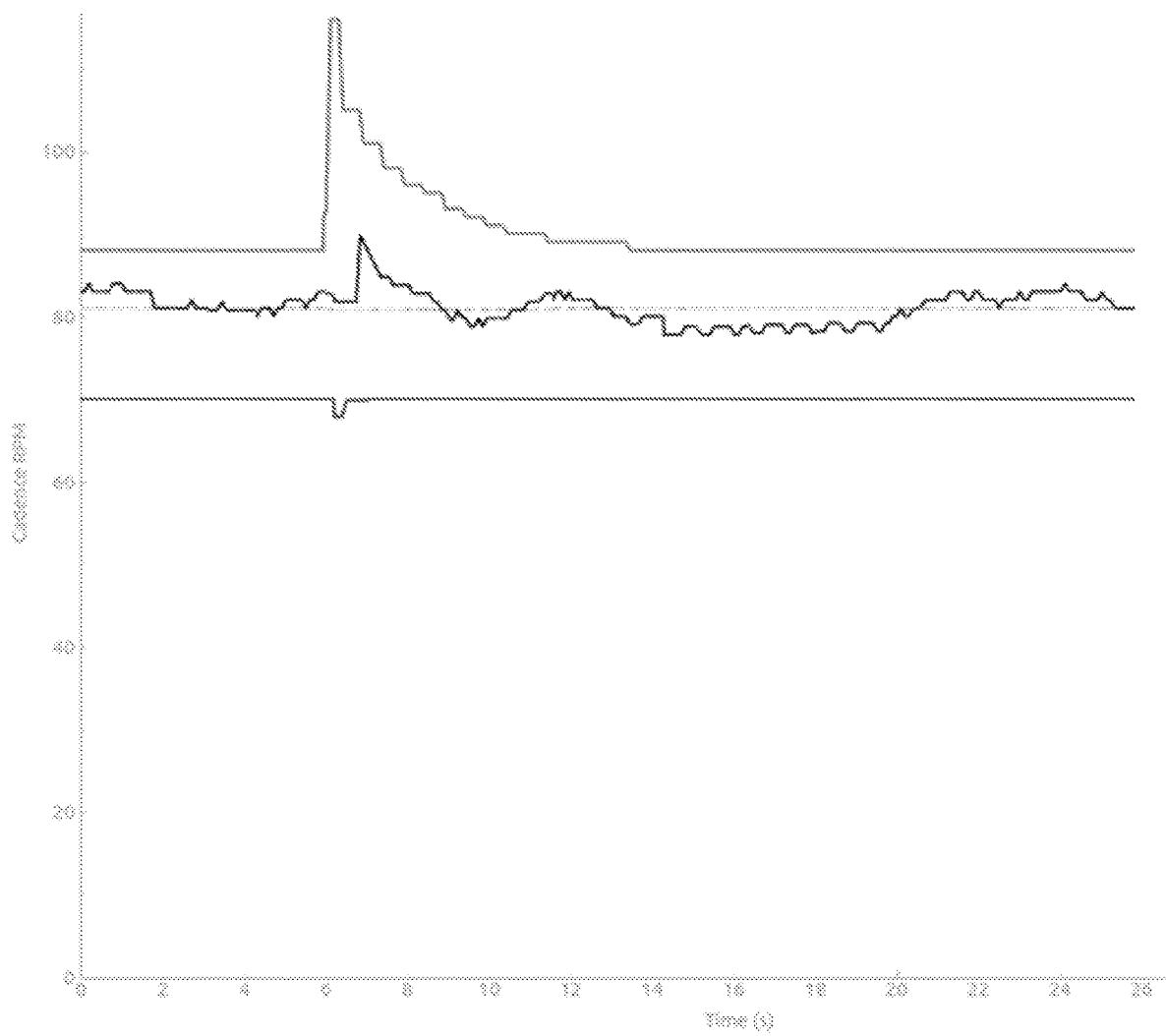
FIG. 8 is a graph of cadence over time for an exemplary manual inboard shift.

FIG. 8 shows an exemplary plot of cadence over time with adjustments to the inboard setpoint and the outboard setpoint with a single inboard shift initiated by the rider outside of the automatic mode. The adjustment to the upper cadence limit prevents a gear shift back to a gear from which the bicycle was shifted.

In act 406, the processor of the system control device determines whether to generate a gear shift command based on the adjusted cadence band from act 404. The processor may determine a cadence (e.g., an average cadence over a period of time, such as the update period) of a crank arm of the bicycle based on data from one or more sensors.

For example, the system control device may determine the cadence of the crank arm of the bicycle based on wheel speed data received from one or more wheel speed sensors of the bicycle and/or cadence data received from, for example, one or more cadence sensors of the bicycle. In one embodiment, the system control device estimates the cadence of the crank arm of the bicycle based on a wheel speed determined from the wheel speed data and a current gear ratio. The system control device compares the determined cadence of the crank arm of the bicycle to the adjusted cadence band from act 404. In other words, the processor may determine whether the determined cadence of the crank arm of the bicycle is within or outside of the adjusted cadence band from act 404.

If the processor determines a gear shift is needed based on, for example, the comparison of the determined cadence of the crank arm of the bicycle to the adjusted cadence band (e.g., the determined cadence is outside of the adjusted cadence band), the method 400 moves to act 408. If the processor determines a gear shift is not needed based on, for example, the comparison (e.g., the determined cadence is within the adjusted cadence band), the method 400 may return to act 404.

In one embodiment, while the method 400 is within an update loop between acts 404 and 406 (e.g., the determined cadence is within the adjusted cadence band), the method may execute acts 404 and 406 once every update period (e.g., 500 ms). In another embodiment, while the method is within the update loop, the comparison of the determined cadence to the adjusted cadence band may be performed a number of times (e.g., five times) between adjustments in act 404. In other words, the comparison of the determined cadence to the adjusted cadence band in act 406 is repeated a number of times, and if the determined cadence is within the adjusted cadence band for each of the comparisons, the method 400 returns to act 404.

In one embodiment, the method 400 stays within the update loop between acts 404 and 406 until the comparison in act 406 determines the determined cadence is outside the adjusted cadence band or a manual shift outside the automatic mode is identified, which may restart the method 400. In another embodiment, assuming the determined cadence stays within the adjusted cadence band, the method 400 may stay within the update loop between acts 404 and 406 for a predetermined number of update periods (e.g., 20, 50, or 100) before exiting the method 400.

As the method alternates between act 404 and act 406 within the update loop, the upper cadence limit and/or the lower cadence limit decays back towards an original value with each update period. For example, the upper cadence limit may decrease to an intermediate value (e.g., a third upper cadence limit) between the second upper cadence limit and the first upper cadence limit after a time period that is less than the first time period (e.g., a third time period). Alternatively (e.g., depending on a direction of the shift) or additionally, the lower cadence limit may increase to an intermediate value (e.g., a third lower cadence limit) between the first lower cadence limit and the second lower cadence limit after the same time period (e.g., the third time period).

As shown in FIG. 5, when an outboard shift is identified in act 402, the second time period is greater than the first time period. As shown in FIG. 6, when an inboard shift is identified in act 402, the first time period is greater than the second time period. This is due to the adjustment to the lower cadence limit being greater than the adjustment to the upper cadence limit when an outboard shift is identified in act 402, and the adjustment to the upper cadence limit being greater than the adjustment to the lower cadence limit when an inboard shift is identified in act 402. With a greater adjustment to a cadence limit (e.g., the lower cadence limit, as in FIG. 5), it takes longer for the cadence limit to decay back to an original value (e.g., see Equations (1) and (2)).

In act 408, the system control device generates a gear shift command based on the comparison in act 406 (e.g., when the determined cadence is outside the adjusted cadence band). If, based on the comparison, the determined cadence is less than the lower cadence limit of the adjusted cadence band, the system control device may generate a gear shift command for an inboard gear shift (e.g., to an easier gear); if, based on the comparison, the determined cadence is greater than the upper cadence limit of the adjusted cadence band, the system control device may generate a gear shift command for an outboard gear shift (e.g., to a harder gear). The gear shift command may include any number of different types of data including, for example, instructions for a motor of the rear derailleur to turn on, a direction of rotation for the motor, a length of time the motor is to remain on, and/or other data.

In one embodiment, a motor of the bicycle is actuated based on the gear shift command generated in act 408. For example, the system control device actuates a motor of the rear derailleur of the bicycle to move the rear derailleur and a chain supported by the rear derailleur to execute the gear shift identified within the gear shift command generated in act 408.

After the gear shift initiated in act 408 is executed, the method 400 returns to act 402. In act 402, the system control device identifies the gear shift command generated in act 408, and the method 400 is performed again.

Figure 9:
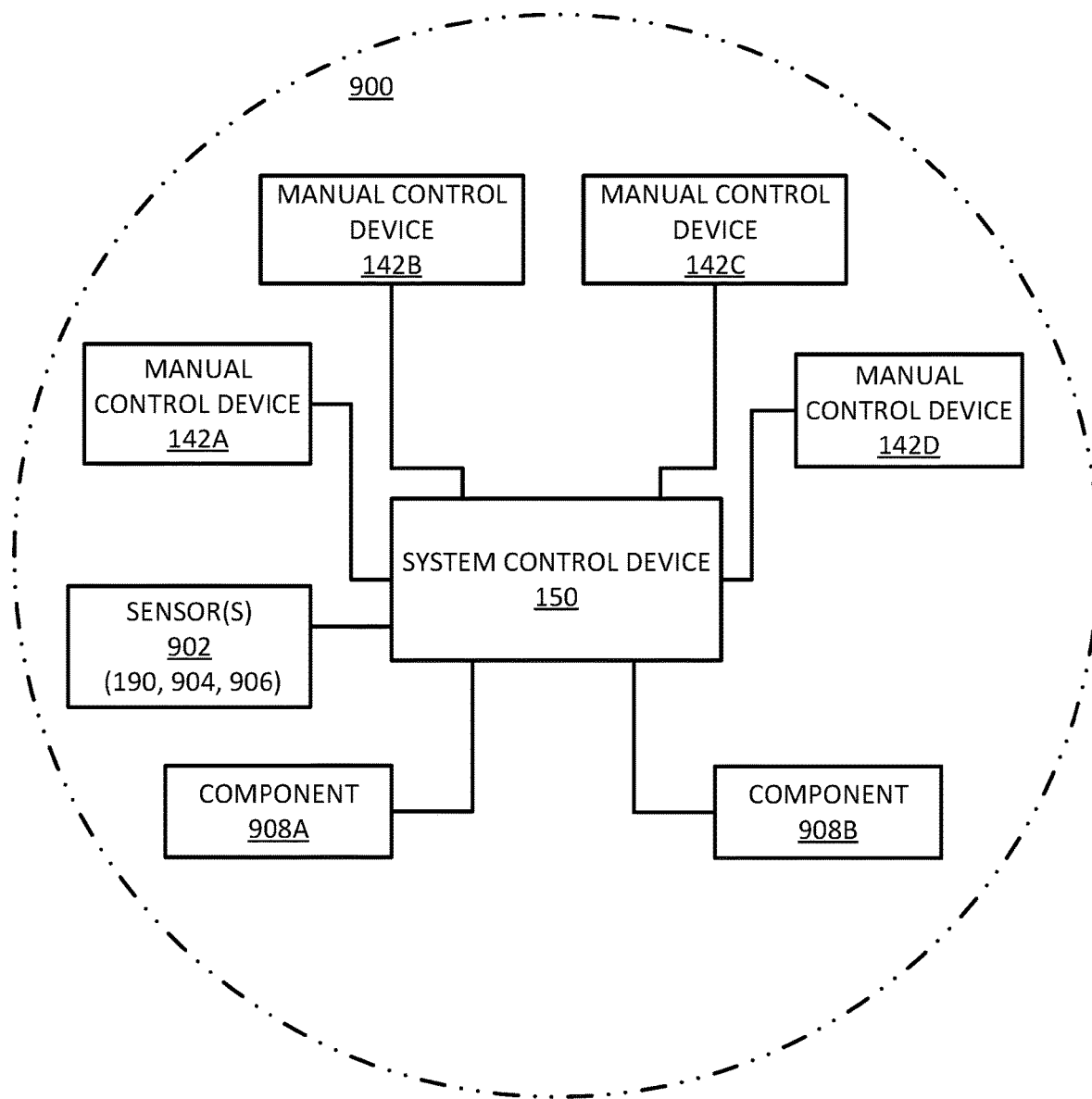
FIG. 9 is a block diagram of an exemplary bicycle control system for implementing methods of controlling a bicycle.

FIG. 9 illustrates a bicycle control system 900 that includes multiple manual control devices 142A-D, a system control device 150, at least one sensor 902, such as the device 190, a cadence sensor 904, and/or a speed sensor 906 described with respect to FIG. 1, and bicycle components 908A-B, such as a rear derailleur and/or a front derailleur, or one or more internal gear hubs. The manual control devices 142A-D are communicatively coupled with the system control device 150, such as by a cable or wirelessly, to communicate control signals to the system control device(s) 142. The system control device 150 is configured to communicate control signals responsive to the received control device signals, or resulting from automatic shifting determinations, to the component(s) 908A-B. In an embodiment, the system control device 150 is configured to communicate the control signals wirelessly to one or multiple bicycle components 908A-B. The control signals may be communicated wirelessly using any technique, protocol, or standard. For example, Institute of Electrical and Electronics Engineers ("IEEE") 802.11 standards, IEEE 802.15.1 or BLUETOOTH® standards, ANT™ or ANT+™ standards, and/or AIREA™ standards may be used. The bicycle components 908A-B may be any bicycle component. For example, the components 908A-B may be a drive train components and/or suspension components. In an embodiment, a component 908A may be a rear derailleur and the other component 908B may be a front derailleur. Other components may also be included. For example, the system control device 150 may be in communication with, or provide control signals for, three or more components, such as a front derailleur, a rear derailleur, and a front suspension system. Alternatively, the system control device 150 may only provide control signals for a single component 908A. In an embodiment, the receiver may communicate control signals wirelessly with one component 908A, and the one component 908A may communicate the control signals to another component 908B.

In an embodiment, the bicycle control system 900 includes at least one manual control device 142 including a control mechanism for generating a control signal to control at least one bicycle component 908A. The system control device 150 may be a standalone device, or may be integrated with one or more components 908A-B.

Figure 10:
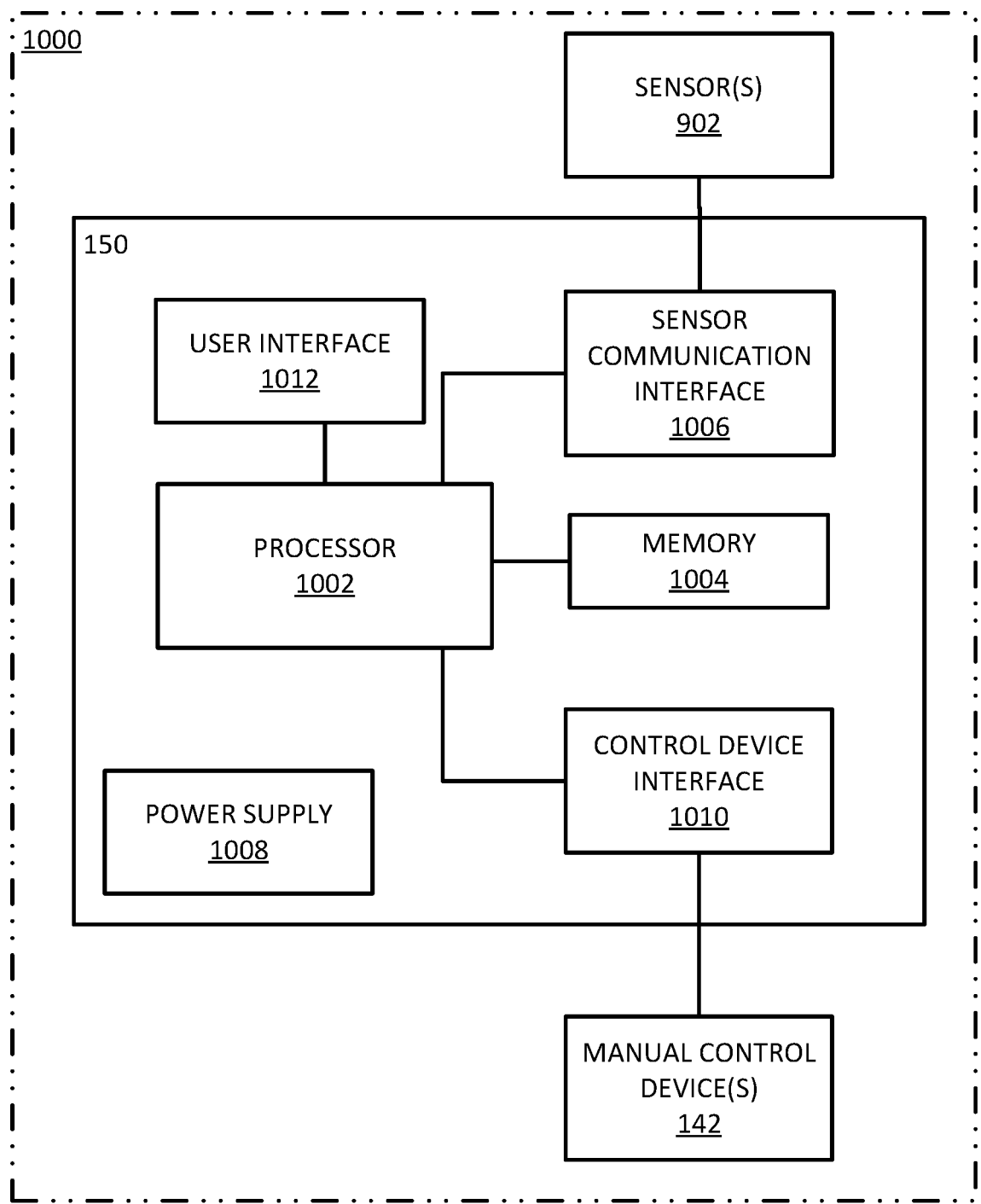
FIG. 10 is a block diagram of an exemplary control device for use in implementing methods of controlling a bicycle.

FIG. 10 is a block diagram of an exemplary control system 1000 for a bicycle that may be used to implement a system control device 150. The control system 1000 may be used alone to communicate with and control bicycle components, or the control system 1000 may be used in conjunction with at least one other control system for components of the bicycle, such as a primary control system that may include alternative control devices such as brake lever housing integrated shift controllers. The control system 1000 includes a system control device 150, one or more control devices 142, and/or one or more sensors 902. The system control device 150 includes a processor 1002, a memory 1004, a sensor communication interface 1006, a power supply 1008, and a control device interface 1010. Optionally, the system control device 150 may also include a user interface 1012. Additional, different, or fewer components are possible for the system control device 150.

The processor 1002 may include a general processor, digital signal processor, an application specific integrated circuit (ASIC), field programmable gate array (FPGA), analog circuit, digital circuit, combinations thereof, or other now known or later developed processor. The processor 1002 may be a single device or combinations of devices, such as through shared or parallel processing. In one embodiment, for example, a CPU 1002 used may be an Atmel® ATmega324PA microcontroller with an internal eeprom memory, and a transmitter and a receiver used may be an Atmel® AT86RF231 2.4 GHz transceiver utilizing AES encryption and DSS spread spectrum technology supporting 16 channels and the IEEE 802.15.4 communication protocol.

The memory 1004 may be a volatile memory or a non-volatile memory. The memory 1004 may include one or more of a read only memory (ROM), random access memory (RAM), a flash memory, an electronic erasable program read only memory (EEPROM), or other type of memory. The memory 1004 may be removable from the system control device 150, such as a secure digital (SD) memory card. In a particular non-limiting, exemplary embodiment, a computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The memory 1004 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

The power supply 1008 is a portable power supply, which may be stored internal to the system control device 150, or stored external to the system control device 150 and communicated to the system control device 150 through a power conductive cable. The power supply 1008 may involve the generation of electric power, for example, using a mechanical power generator, a fuel cell device, photo-voltaic cells, or other power generating devices. The power supply 1008 may include a battery such as a device consisting of two or more electrochemical cells that convert stored chemical energy into electrical energy. The power supply 1008 may include a combination of multiple batteries or other power providing devices. Specially fitted or configured battery types, or standard battery types such as CR 2012, CR 2016, and/or CR 2032 may be used.

The control device interface 1010 provides for data communication from the control devices 142 to the system control device 150. The control device interface 1010 includes wired conductive signal and/or data communication circuitry operable to interpret signals provided by different control devices 142. For example, the control device interface 1010 may include a series of ports for receiving control device input cables. Each of the ports may be distinguishable by the processor 1002 through grouping tables or arrays, or through physical circuits or other circuitry that provide for grouping control device inputs. Alternatively, different control devices 142 may communicate with the system control device 150 wirelessly as is described herein.

The user interface 1012 may be one or more buttons, keypad, keyboard, mouse, stylus pen, trackball, rocker switch, touch pad, voice recognition circuit, or other device or component for communicating data between a user and the system control device 150. The user interface 1012 may be a touch screen, which may be capacitive or resistive. The user interface 1012 may include a liquid crystal display ("LCD") panel, light emitting diode (LED), LED screen, thin film transistor screen, or another type of display. The user interface 1012 may also include audio capabilities, or speakers. In an embodiment, the user interface is configured to provide a notice to a user that the system control device 150 has entered automatic mode, paused automatic mode, exited automatic mode, and/or modified a parameter of automatic mode. The notice may be audible, visual, and/or haptic. For example, an audible beep may be used. In an embodiment, an LCD panel is configured to display a visual notice.

In an embodiment, the user interface 1012 includes multiple buttons and an LED indicator. The multiple buttons are used to communicate commands to the system control device 150, and the LED indicator lights to indicate input of the commands.

The sensor communication interface 1006 is configured to communicate data such as sensor values with at least one sensor 902 The sensor communication interface 1006 communicates the data using any operable connection. An operable connection may be one in which signals, physical communications, and/or logical communications may be sent and/or received. An operable connection may include a physical interface, an electrical interface, and/or a data interface. The sensor communication interface 80 provides for wireless communications in any now known or later developed format.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In an embodiment, components of the bicycle described herein will communicate with each other. In the case of wireless communication, the components will initially be paired so as to allow secure communication between components on the bicycle without interference from devices not associated with the system. Next one or more of the components may be paired with a separate device like a computer, tablet or phone. This paired device may provide the user interface to allow the user to communicate with the components on the bicycle, for example the system control device 150. Examples of communication are updating firmware, setting variables, and running diagnostic tools and analysis.

In accordance with various embodiments of the present disclosure, the methods described herein may be implemented with software programs executable by a computer system, such as the system control device 150. Further, in an exemplary, non-limited embodiment, implementations can include distributed processing, component/object distributed processing, and parallel processing. Alternatively, virtual computer system processing can be constructed to implement one or more of the methods or functionality as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows may also be performed by, and the apparatus may also be implemented as, special purpose logic circuitry (e.g., a field programmable gate array (FPGA) or an application specific integrated circuit (ASIC)).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or a system control device 150 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a system control device 150 is integrated with a mobile telephone, PDA, a mobile audio player, a GPS receiver, and communicates wirelessly with bicycle components to provide automatic mode control.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method for controlling electronic shifting of a bicycle, the method comprising:
    identifying, by a processor, a gear shift command;
    adjusting, by the processor, a cadence band based on the identified gear shift command, the cadence band including an upper cadence limit and a lower cadence limit, wherein adjusting the cadence band comprises increasing the upper cadence limit, decreasing the lower cadence limit, or increasing the upper cadence limit and decreasing the lower cadence limit; and
    controlling the electronic shifting of the bicycle based on the adjusted cadence band.

2. The method of claim 1, wherein adjusting the cadence band comprises:
    increasing the upper cadence limit from a first upper cadence limit to a second upper cadence limit, and after increasing the upper cadence limit, decreasing the upper cadence limit from the second upper cadence limit to the first upper cadence limit over a first time period;
    decreasing the lower cadence limit from a first lower cadence limit to a second lower cadence limit, and after decreasing the lower cadence limit, increasing the lower cadence limit from the second lower cadence limit to the first lower cadence limit over a second time period; or
    a combination thereof.

3. The method of claim 2, wherein adjusting the cadence band comprises the combination thereof,
    wherein decreasing the upper cadence limit from the second upper cadence limit to the first upper cadence limit over the first time period comprises decreasing the upper cadence limit from the second upper cadence limit to a third upper cadence limit over a third time period, the third time period being less than the first time period, the third upper cadence limit being intermediate relative to the second upper cadence limit and the first upper cadence limit, and
    wherein increasing the lower cadence limit from the second lower cadence limit to the first lower cadence limit over the second time period comprises increasing the lower cadence limit from the second lower cadence limit to a third lower cadence limit over the third time period, the third lower cadence limit being intermediate relative to the second lower cadence limit and the first lower cadence limit.

4. The method of claim 2, further comprising identifying, by the processor, an upper cadence limit modifier, a lower cadence limit modifier, a first decay factor, a second decay factor, or any combination thereof, the first decay factor being for the decreasing of the upper cadence limit from the second upper cadence limit to the first upper cadence limit over the first time period, the second decay factor being for the increasing of the lower cadence limit from the second lower cadence limit to the first lower cadence limit over the second time period,
    wherein the increasing of the upper cadence limit comprises increasing the upper cadence limit from the first upper cadence limit to the second upper cadence limit based on the upper cadence limit modifier, and the decreasing of the upper cadence limit comprises decreasing the upper cadence limit from the second upper cadence limit to the first upper cadence limit over the first time period based on the first decay factor, and
    wherein the decreasing of the lower cadence limit comprises decreasing the lower cadence limit from the first lower cadence limit to the second lower cadence limit based on the lower cadence limit modifier, and the increasing of the lower cadence limit comprises increasing the lower cadence limit from the second lower cadence limit to the first lower cadence limit over the second time period based on the second decay factor.

5. The method of claim 4, further comprising storing, by a memory, historical data related to cadence changes after gear shifts,
    wherein identifying the upper cadence limit modifier, the lower cadence modifier, the first decay factor, the second decay factor, or the respective combination thereof comprises determining the upper cadence limit modifier, the lower cadence modifier, the first decay factor, the second decay factor, or the respective combination thereof based on the historical data.

6. The method of claim 2, wherein adjusting the cadence band comprises the combination thereof,
    wherein decreasing the upper cadence limit from the second upper cadence limit to the first upper cadence limit over the first time period comprises decreasing the upper cadence limit exponentially or linearly from the second upper cadence limit to the first upper cadence limit over the first time period, and
    wherein increasing the lower cadence limit from the second lower cadence limit to the first lower cadence limit over the second time period comprises increasing the lower cadence limit exponentially or linearly from the second lower cadence limit to the first lower cadence limit.

7. The method of claim 6, further comprising:
    determining a type of the gear shift command; and
    setting the second upper cadence limit, the first time period, the second lower cadence limit, the second time period, or any combination thereof based on the determined type of the gear shift command.

8. The method of claim 7, wherein determining the type of the gear shift command comprises:

determining a shift direction based on the gear shift command;
determining a number of shifts based on the gear shift command; and
determining a source of the gear shift command, the source of the gear shift command being a shifting device of the bicycle or the processor.

9. The method of claim 8, wherein when the determined shift direction is outboard:
a difference between the first lower cadence limit and the second lower cadence limit is greater than a difference between the second upper cadence limit and the first upper cadence limit; and
the second time period of time is greater than the first time period.

10. The method of claim 8, wherein when the determined shift direction is outboard, the second time period and a difference between the first lower cadence limit and the second lower cadence limit when the determined number of shifts is two or more are greater than the second time period and a difference between the first lower cadence limit and the second lower cadence limit when the determined number of shifts is one, respectively.

11. The method of claim 8, wherein when the determined shift direction is outboard, the second time period and the difference between the first lower cadence limit and the second lower cadence limit when the determined source of the gear shift command is the shifting device are greater than the second time period and the difference between the first lower cadence limit and the second lower cadence limit when the determined source of the gear shift command is the processor, respectively.

12. The method of claim 1, further comprising identifying, by the processor, a cadence of a crank arm of the bicycle,
wherein controlling the electronic shifting of the bicycle based on the adjusted cadence band comprises actuating a motor of a rear derailleur of the bicycle for the electronic shifting of the bicycle when the identified cadence is outside of the adjusted cadence band.

13. The method of claim 1, further comprising:
determining, by a sensor, a cadence of the bicycle; and
comparing, by the processor, the determined cadence of the bicycle to the cadence band,
wherein identifying the gear shift command comprises generating, by the processor, based on the comparison, the gear shift command when the determined cadence of the bicycle is outside the cadence band.

14. The method of claim 1, wherein adjusting the cadence band based on the identified gear shift command comprises:
determining a gear number from which the bicycle is being shifted for the gear shift command; and
adjusting the cadence band a predetermined amount corresponding to the determined gear number.

15. A controller for a bicycle, the controller comprising:
a memory configured to store one or more parameters for a predetermined cadence band, the predetermined cadence band corresponding to a gear shift from a first gear to a second gear; and
a processor in communication with the memory, the processor being configured to:
identify a gear shift command for the gear shift from the first gear to the second gear;
adjust, based on the identified gear shift command, a cadence band for control of electronic shifting of the bicycle based on the one or more parameters, the cadence band including an upper cadence limit and a lower cadence limit; and
control the electronic shifting of the bicycle based on the adjusted cadence band,
wherein the adjustment of the cadence band comprises:
an increase of the upper cadence limit from a first upper cadence limit to a second upper cadence limit, and after the increase of the upper cadence limit, a decrease of the upper cadence limit from the second upper cadence limit to the first upper cadence limit over a first time period; and
a decrease of the lower cadence limit from a first lower cadence limit to a second lower cadence limit, and after the decrease of the lower cadence limit, an increase of the lower cadence limit from the second lower cadence limit to the first lower cadence limit over a second time period.

16. The controller of claim 15, wherein the decrease of the upper cadence limit from the second upper cadence limit to the first upper cadence limit over the first time period comprises a decrease of the upper cadence limit exponentially or linearly from the second upper cadence limit to the first upper cadence limit over the first time period, and
wherein the increase of the lower cadence limit from the second lower cadence limit to the first lower cadence limit over the second time period comprises an increase of the lower cadence limit exponentially or linearly from the second lower cadence limit to the first lower cadence limit.

17. The controller of claim 16, wherein the one or more parameters include a first modifier value for the increase of the upper cadence limit, a second modifier value for the decrease of the lower cadence limit, a first decay rate for the decrease of the upper cadence limit, a second decay rate for the increase of the lower cadence limit, or any combination thereof.

18. The controller of claim 16, wherein the processor is further configured to:
determine a type of the gear shift command, the determination of the type of the gear shift command comprising a determination of a shift direction based on the gear shift command; and
set the second upper cadence limit, the first time period, the second lower cadence limit, the second time period, or any combination thereof based on the determined type of the gear shift command.

19. The controller of claim 18, wherein when the determined shift direction is inboard:
a difference between the second upper cadence limit and the first upper cadence limit is greater than a difference between the first lower cadence limit and the second lower cadence limit; and
the first time period is greater than the second time period.

20. In a non-transitory computer-readable storage medium that stores instructions executable by one or more processors to control electronic shifting of a bicycle, the instructions comprising:
identifying, by a processor, a gear shift command;
adjusting, by the processor, a cadence band based on the identified gear shift command, the cadence band including an upper cadence limit and a lower cadence limit, wherein adjusting the cadence band comprises increasing the upper cadence limit, decreasing the lower cadence limit, or increasing the upper cadence limit and decreasing the lower cadence limit; and controlling the electronic shifting of the bicycle based on the adjusted cadence band.

* * * * *